US006873356B1

(12) United States Patent
Kanbe et al.

(10) Patent No.: US 6,873,356 B1
(45) Date of Patent: Mar. 29, 2005

(54) EXPANSION UNIT, PORTABLE DATA PROCESSING APPARATUS AND IMAGING DEVICE

(75) Inventors: Katsuhito Kanbe, Kawasaki (JP); Hidehiko Fuchida, Kawasaki (JP); Tosio Yoseyama, Kawasaki (JP); Mitsuo Maeda, Kawasaki (JP)

(73) Assignees: Fujitsu Limited, Kawasaki (JP); Fujitsu General Limited, Kawasaki (JP)

( * ) Notice: Subject to any disclaimer, the term of this patent is extended or adjusted under 35 U.S.C. 154(b) by 937 days.

(21) Appl. No.: 09/650,759

(22) Filed: Aug. 30, 2000

(30) Foreign Application Priority Data

Aug. 31, 1999 (JP) ............................................ 11-246403

(51) Int. Cl.[7] .............................................. H04N 5/225
(52) U.S. Cl. .................... 348/207.1; 348/375; 348/552; 361/686
(58) Field of Search .......................... 348/207.99, 207.1, 348/207.11, 211.99, 220.1, 333.01, 333.06, 333.07, 373, 374, 375, 376, 552, 231.7; 361/686, 756

(56) References Cited

U.S. PATENT DOCUMENTS

| 5,790,193 | A | * | 8/1998 | Ohmori ....................... 348/375 |
| 5,867,218 | A | | 2/1999 | Matsuzaki et al. |
| 6,163,344 | A | * | 12/2000 | Kawamura et al. .......... 348/552 |
| 6,525,767 | B2 | * | 2/2003 | Saito et al. ............... 348/231.7 |
| 6,525,932 | B1 | * | 2/2003 | Ohnishi et al. ............. 361/686 |

FOREIGN PATENT DOCUMENTS

| EP | 0 683 596 | 11/1995 |
| EP | 0 705 037 | 4/1996 |
| JP | 59-138920 | 9/1984 |
| JP | 5-66855 | 3/1993 |
| JP | 3011657 | 3/1995 |
| JP | 7-322117 | 12/1995 |
| JP | 8-9215 | 1/1996 |
| JP | 8-98076 | 4/1996 |
| JP | 9-128091 | 5/1997 |
| JP | 3044340 | 10/1997 |
| JP | 10-51665 | 2/1998 |
| JP | 10-126666 | 5/1998 |
| JP | 10-271376 | 10/1998 |
| JP | 10-301718 | 11/1998 |
| JP | 11-53060 | 2/1999 |

OTHER PUBLICATIONS

Partial translation of Mobile PC "InterLink" MP–C101, pp. 1–10, 1999.
Partial Translation of SONY—Motion Eye—PCG–C1S.
Partial translation of PANASONIC—1999.
Partial Translation of TOSHIBA– Libretto FF 1100–1999.
Expansion Unit and Electronic Apparatus, U.S. Appl. No. 09/639,772 filed Aug. 16, 2000, based on Japan laid Open No. 11–232044.

* cited by examiner

Primary Examiner—Tuan Ho
(74) Attorney, Agent, or Firm—Westerman, Hattori, Daniels & Adrian, LLP

(57) ABSTRACT

An expansion unit capable of being detachably mounted to an expansion bay of an information processing apparatus, the expansion unit including an imaging device, a moving member moving the imaging device between a state in which the imaging device is stored inside the expansion unit and a state in which the imaging device projects outwardly from the expansion unit, and a member capable of changing a direction in which the imaging device is pointed when the imaging device is extended from the expansion unit, the imaging device being detachable from the expansion unit and supportable in such detached state.

13 Claims, 26 Drawing Sheets

AS VIEWED FROM
A ↑

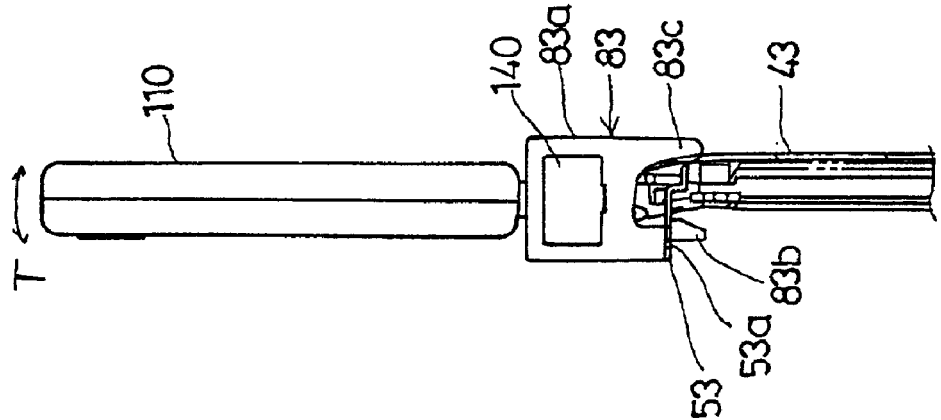
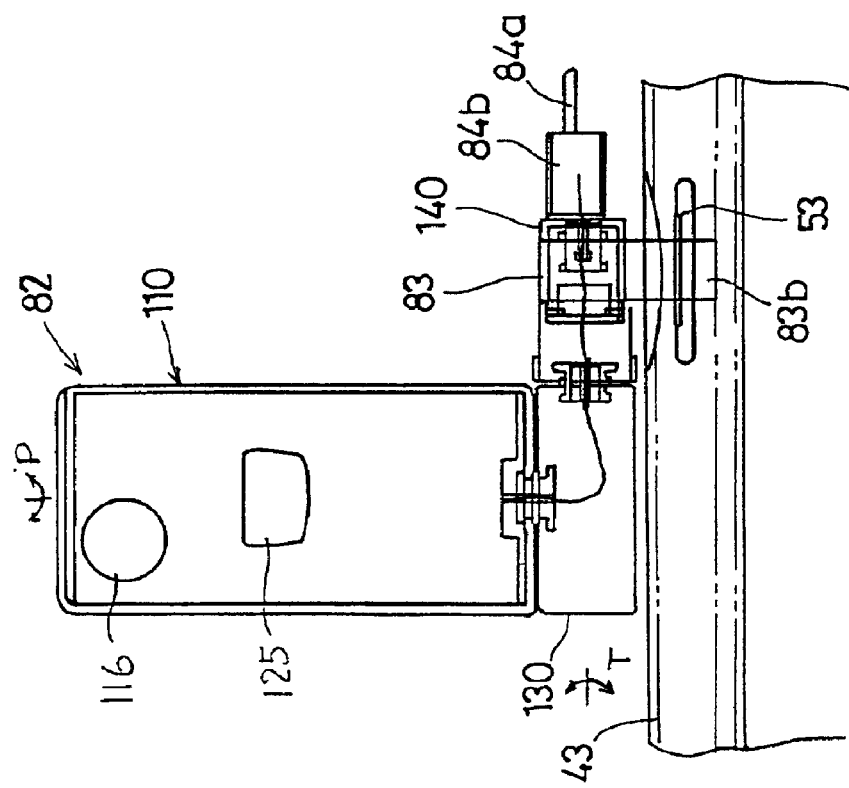

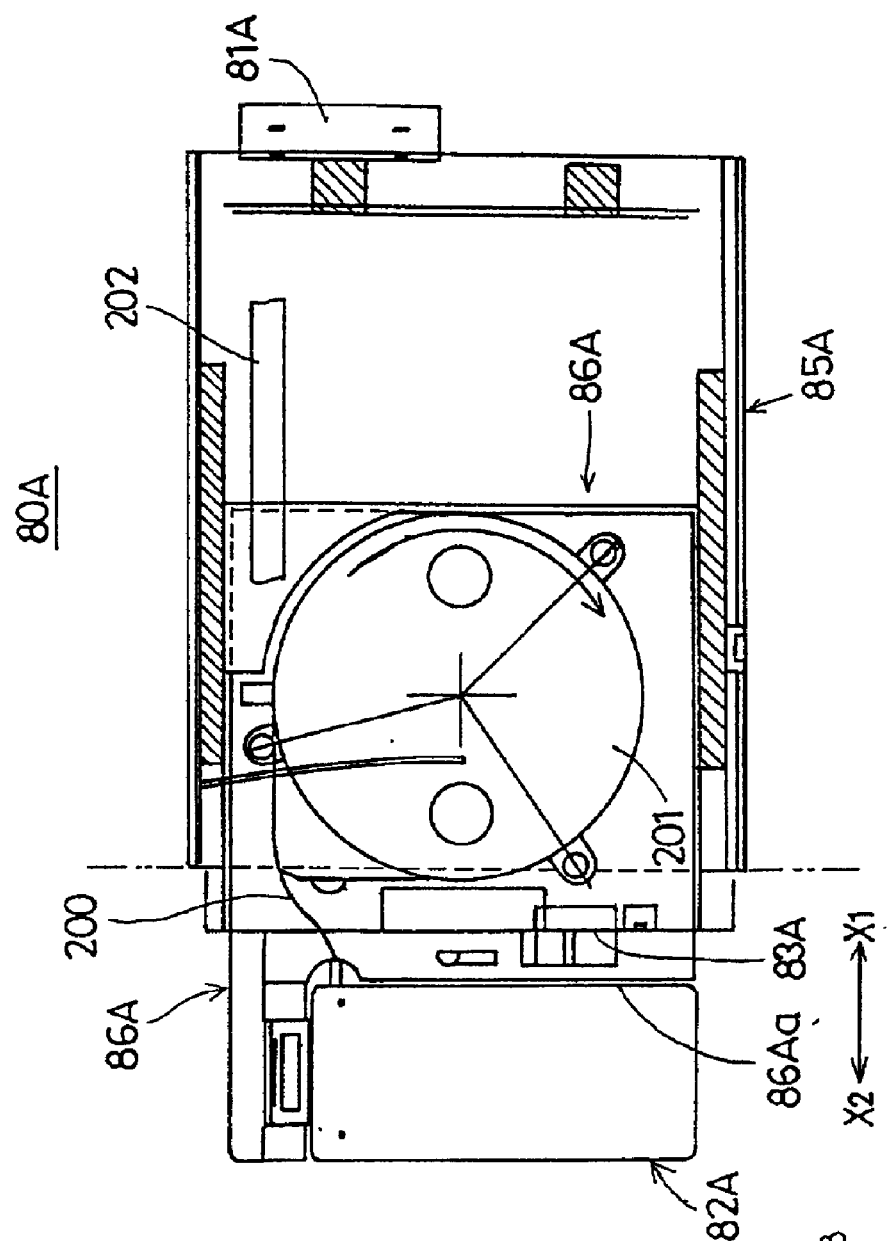
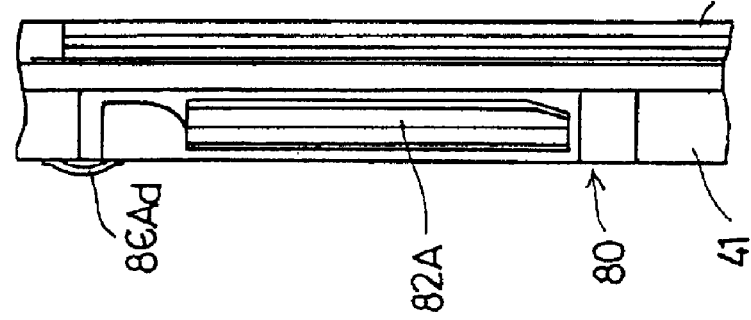

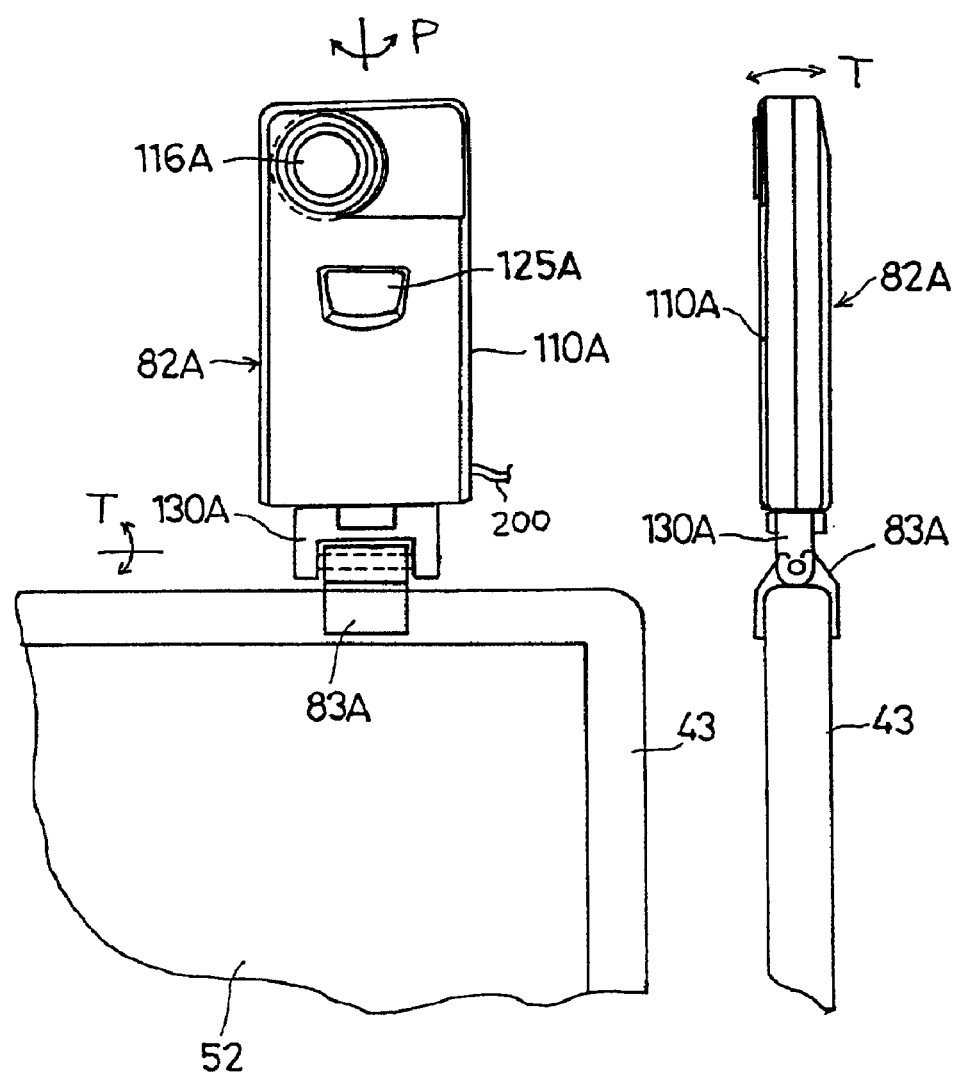

EXPANSION UNIT, PORTABLE DATA PROCESSING APPARATUS AND IMAGING DEVICE

BACKGROUND OF THE INVENTION

1. Field of the Invention

The present invention relates generally to an expansion unit, portable data processing apparatus and imaging device.

2. Description of the Related Art

Recent advances in portable information processing apparatuses such as laptop-type personal computers (hereinafter PCs) have made it possible to send photographic data via e-mail using such PCs. In addition, the number of types of recording media has also increased and now varies from floppy disks to CD-ROMs, optical disks and so forth.

In order to provide these enhanced capabilities and accommodate this expanding array of recording media, laptop PCs have come to be provided with one or more expansion slots and/or a concave expansion bay capable of accommodating detachable accessories including, but not limited to, floppy disk drives, expansion CD-ROM drives, expansion magneto-optic disk drives and the like. Consumers are thus able to purchase add-on accessories as discrete modules or expansion units which can then be inserted into the expansion bay and expansion slots of the PC.

For example, Japanese Laid-Open Patent App. No. 8-9215 and Japanese Laid-Open Patent App. No. 7-322117 show a charge-coupled device (hereinafter CCD) imaging device provided on an edge of a PCMCIA (Personal Computer Memory Card International Association) card or PC card. This CCD imaging device PC card is operated by inserting the PC card into a slot in the portable information processing apparatus (hereinafter apparatus) provided for that purpose.

In addition, Japanese Registered Utility Model No. 3011657 shows a tower-type desktop PC provided with a bay on the front of the PC for mounting an electronic imaging device unit. The electronic imaging device is inserted into the bay in such a way so as to be supportedly extendible from the front of the apparatus.

Additional commercially available configurations exist as shown in FIGS. 1, 2 and 3.

For example, FIG. 1 shows a commercially available laptop-type PC 10. The laptop PC 10 shown in the drawing has a CCD imaging device 11. The CCD imaging device 11 is provided on a display member 12, near a top edge of a liquid crystal display panel 13.

FIG. 2 shows another example of a commercially available laptop-type PC 20. The laptop PC 20 shown in the drawing has a CCD imaging device unit 23 having a CCD imaging device 21 and a connector 22, the CCD imaging device unit 23 being detachably mounted on approximately a right rear half of the PC main unit 24.

FIG. 3 shows yet another example of a commercially available laptop-type PC 30. The laptop PC 30 shown in the drawing has a CCD imaging device unit 32 that includes a CCD imaging device 31, the imaging device unit 32 being detachably connected to a terminal on a central part of a rear surface of a PC main unit 33. The CCD imaging device unit 32 thus removed is then supported on a tripod not shown in the drawing.

However, each of these examples has disadvantages.

For example, in the structure disclosed in Japanese Laid-Open Patent App. No. 8-9215 and Japanese Laid-Open Patent App. No. 7-322117, when the PC card is inserted into the apparatus the CCD imaging device protrudes from a side of the apparatus, making it difficult to carry the apparatus comfortably. Also, disconnecting the CCD imaging device is not a practical solution because once disconnected from the apparatus the CCD imaging device cannot be used.

Moreover, the structure disclosed in Japanese Registered Utility Model No. 3011657 is not portable, and the electronic imaging device unit is fixedly mounted to the PC bay and cannot be detached therefrom. Also, since the electronic imaging device cannot be detached from the electronic imaging device unit the use of the imaging device is severely limited.

Additional problems also beset the above-described conventional structures. For example, with the laptop PC 10 shown in FIG. 1 the CCD imaging device 11 can only be tilted; the lens cannot, for example, be swung laterally so as to pan the imaging device. Accordingly, a person using the CCD imaging device 11 must reposition the entire laptop PC 10 in order to photograph a person next to the person using the imaging device, which is inconvenient.

Moreover, because the CCD imaging device 11 is positioned on the display member 12 the display member 12 must be specially designed to accommodate the CCD imaging device 11, placing limitations on the size of the liquid crystal display. In addition, when the display member 12 is closed an operator's fingers can come into contact with and thereby damage the lens of the CCD imaging device 11. A further disadvantage is that the positioning of the CCD imaging device 11 on the display member 12 complicates repair of the CCD imaging device 11.

The laptop PC 20 shown in FIG. 2 also has disadvantages. As with the laptop PC 10 shown in FIG. 1, the CCD imaging device 21 can only be tilted; it cannot be panned. Accordingly, as with the laptop PC 10 shown in FIG. 1, a person using the CCD imaging device 11 must rearrange the position of the entire laptop PC 10 in order to photograph a person next to the person using the imaging device, which is inconvenient.

Additionally, the display member 25 is attached to the PC main unit 24 via a hinge 26 which is specially designed to take up only approximately the left half of the hinge area as shown in FIG. 2. As a result the display member is supported along only approximately half its length, which is unstable and therefore undesirable.

Further, with the laptop PC 30 shown in FIG. 3, as with the laptop PC 10 shown in FIG. 1, the CCD imaging device 31 can only be tilted and not panned. Accordingly, as described above, a person using the CCD imaging device 11 must reposition the entire laptop PC 10 in order to photograph a person next to the person using the imaging device, which is inconvenient.

In addition, the position of the CCD imaging device unit 32 is such that a long narrow groove 36 must be cut in the display member 35 that is linked with the PC main unit 33 via a hinge 34 along the length of the CCD imaging device unit 32, which severely limits the size of the liquid crystal display panel 37.

Moreover, the laptop PCs 10, 20 and 30 shown in FIGS. 1, 2 and 3, respectively, all presuppose that the CCD imaging device is to be integrally disposed on the PC, which is a waste of equipment and space as far as those operators who essentially use the CCD imaging device seldom or never are concerned. In addition, even those PC operators who do make active use of the CCD imaging device so provided sometimes do not need to use the imaging device.

At those times, the inclusion of the imaging device is also an unnecessary expenditure of equipment and space.

SUMMARY OF THE INVENTION

Accordingly, it is a general object of the present invention to provide an improved and useful expansion unit, portable data processing apparatus and imaging device for same, in which the above-described disadvantages are eliminated.

Another, further and more specific object of the present invention is to provide an expansion unit that improves the portability of the apparatus by mounting the imaging device on the expansion unit that fits into the expansion bay on the apparatus.

Still another, further and more specific object of the present invention is to provide an expansion unit that improves the capabilities of the imaging device by providing an imaging device that can be swung laterally, that is, panned.

Still another, further and more specific object of the present invention is to provide an expansion unit that improves the capabilities of the imaging device by providing an imaging device that can be detached from the expansion unit and disposed on another part of the apparatus.

Still another, further and more specific object of the present invention is to provide a slim imaging device capable of being adapted to the slim expansion units made available by recent advances in computer technology.

The above-described objects of the present invention are achieved by an expansion unit capable of being detachably mounted to an expansion bay of an information processing apparatus, the expansion unit comprising:
   an imaging device;
   a moving member moving the imaging device between a state in which the imaging device is stored inside the expansion unit and a state in which the imaging device projects outwardly from the expansion unit; and
   a member capable of changing a direction in which the imaging device is pointed when the imaging device is extended from the expansion unit,
   the imaging device being detachable from the expansion unit and supportable in such detached state.

According to the invention described above, the information processing apparatus is carried about with the expansion unit mounted in the expansion bay, so the imaging device is contained in the information processing apparatus of which it becomes a part, and moreover, does not project or protrude from the information processing apparatus, thus improving the portability of the apparatus.

Moreover, the ease with which the imaging device can be used is improved and its range of use is expanded because the imaging device can be panned laterally as well as swung vertically, and additionally, can be detached from the expansion unit and mounted on another part of the portable information processing apparatus.

In addition, because the imaging device is provided on the expansion unit, the disadvantages inherent in providing the imaging device directly on the portable information processing apparatus, such as limiting the size of the liquid crystal display or complicating repair of the imaging device itself, are eliminated.

Additionally, the above-described objects of the present invention are also achieved by a portable information processing apparatus comprising:
   an imaging device;
   a moving member moving the imaging device between a state in which the imaging device is stored inside the portable information processing apparatus and a state in which the imaging device projects outwardly from the portable information processing apparatus; and
   a member capable of changing a direction in which the imaging device is pointed when the imaging device is extended from the portable information processing apparatus,
   the imaging device capable of being supportedly detached from the portable information processing apparatus.

According to the invention described above, the information processing apparatus is carried about with the expansion unit mounted in the expansion bay, so the imaging device is contained in the information processing apparatus of which it becomes a part, and moreover, does not project or protrude from the information processing apparatus, thus improving the portability of the apparatus.

Moreover, the ease with which the imaging device can be used is improved and its range of use is expanded because the imaging device can be panned laterally as well as swung vertically, and additionally, can be supportedly detached from the portable information processing apparatus.

Additionally, the above-described objects of the present invention are also achieved by an imaging device comprising:
   a lens assembly;
   a first printed circuit board;
   a second printed circuit board separate from the first printed circuit board; and
   a housing for accommodating the lens assembly, the first printed circuit board and the second printed circuit board,
   the lens assembly being mounted on the second printed circuit board, an intermediate portion of a thickness in a direction of focus of the lens assembly having a height identical to a height of the first printed circuit board, the lens assembly and the first and second printed circuit boards being accommodated within the housing.

According to the invention described above, the thickness of the first printed circuit board on which electronic parts are mounted is less than the height of the lens, thus making it possible to make the imaging device thinner than if the lens were to be mounted atop the printed circuit board.

Additionally, the above-described objects of the present invention are also achieved by an imaging device comprising:
   a lens assembly;
   a printed circuit board; and
   a housing,
   the lens assembly being mounted on the printed circuit board, the housing accommodating the lens assembly and the printed circuit board, a focus adjustment portion of the lens assembly being provided on an intermediate portion of a thickness of the lens assembly in a direction of focus of the lens so as to be exposed at a side surface of the housing.

According to the invention described above, the imaging device can be made thinner than if the focus adjustment member were to be mounted on a front of the lens.

Additionally, the above-described objects of the present invention are also achieved by an imaging device comprising:
   a base;
   a body disposed at substantially a right angle to the base;
   a connector disposed at substantially a right angle to the base;

a connecting member that rotatably connects the body to the base; and another connecting member that rotatably connects the connector to the base.

According to the invention described above, the imaging device can be panned, or moved laterally, as well as moved vertically, thus improving the ease with which the imaging device can be used and expanding its range of use.

Other objects, features and advantages of the present invention will become more apparent from the following detailed description when read in conjunction with the accompanying drawings.

BRIEF DESCRIPTION OF THE DRAWINGS

FIGS. 20A and 20B are diagrams showing front and side views of the CCD being supported in a second usage state;

FIGS. 22A and 22B are diagrams showing front and side views of a CCD expansion unit according to a second embodiment of the present invention;

FIGS. 26A and 26B are diagrams showing front and side views of the CCD imaging device being supported in a second usage state.

DESCRIPTION OF THE PREFERRED EMBODIMENTS

A description will now be given of embodiments of the present invention, with reference to the accompanying drawings.

It should be noted that identical or corresponding elements in the embodiments are given identical or corresponding reference numbers in all drawings and detailed descriptions thereof are omitted.

For clarity, a brief description will be given of a CCD imaging device expansion unit according to a first embodiment of the present invention.

Figure 4:
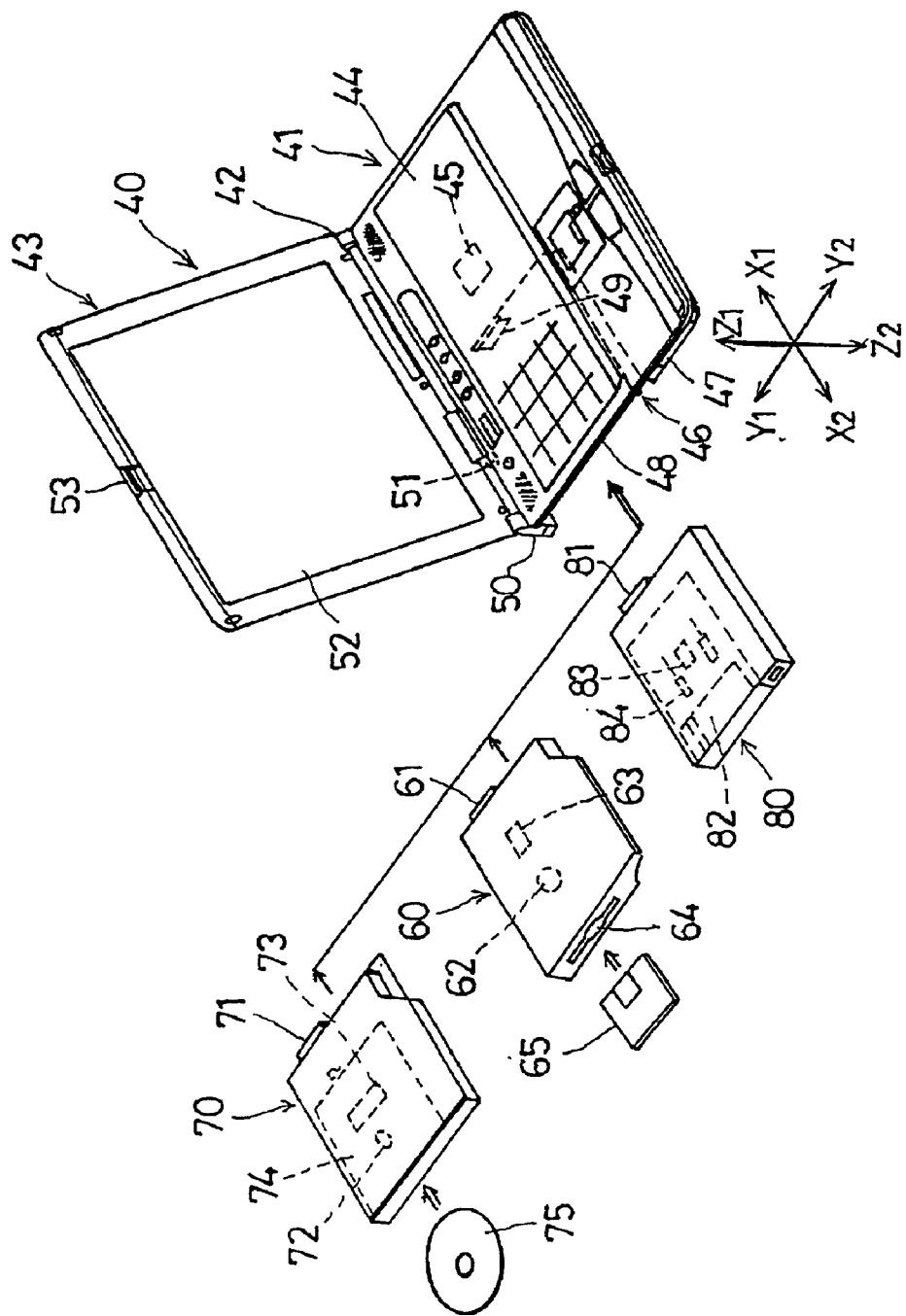
FIG. 4 is a diagram showing a CCD imaging device expansion unit as well as other expansion units together with a laptop-type PC according to a first embodiment of the present invention.

FIG. 4 is a diagram showing a CCD imaging device expansion unit 80 as well as other expansion units (such as a floppy disk expansion unit 60 and so on) together with a laptop-type PC 40 according to a first embodiment of the present invention.

The laptop-type PC 40 shown in FIG. 4 comprises a main unit 41 and a display unit 43 swingingly connected to the main unit 41 via a hinge unit 42. For convenience, an X1, X2 direction denotes a width direction of the PC 40 side to side, a Y1, Y2 direction denotes a depth direction front to back of the PC 40, and a Z1, Z2 direction denotes a vertical direction top to bottom of the PC 40.

In addition, the main unit 41 of the PC 40 has a keyboard area 44 on a top surface thereof, a CPU 45 built into the interior of the main unit 41 and an expansion bay 46 formed as a storage space in a bottom surface of the main unit 41. The expansion bay 46 is formed on the X2 side half of the main unit 41, with an opening 48 formed on a left side surface 47 of the main unit 41 as an entry to the expansion bay 46. A connector 49 is provided in the interior of the expansion bay 46. An ordinary Universal Serial Bus, or USB, connector 51 is provided on a rear surface 50 of the main unit 41.

A liquid crystal display (hereinafter LCD) panel 52 is provided on the display unit 43, with a locking mechanism 53 provided on a center of a front edge of the display unit 43. FIG. 4 shows a state in which the display unit 43 is open. The display unit 43 is put into a closed state covering the main unit 41 by engaging the locking mechanism 53.

The laptop-type PC 40 shown in FIG. 4 does not include a CCD imaging device. Accordingly, the size of the LCD panel 52 is not limited by the CCD imaging device, so a larger LCD panel 52 can be provided on the display unit 43.

A floppy disk expansion unit 60 and a CD-ROM expansion unit 70 are provided as accessory units to the laptop-type PC 40 shown in FIG. 4. The expansion units 60 and 70 have a flat shape so as to be passed through the opening 48 described above and inserted into the expansion bay 46. In addition, the expansion units 60, 70 have identical connectors 61, 71 at identical locations on a front edge of an X1 side of the expansion units 60, 70 that are also a leading edge of the expansion units 60, 70 when the expansion units 60, 70 are inserted into the expansion bay 46. It will be appreciated that the expansion units 60, 70 are detachably inserted by the operator into the expansion bay 46 of the laptop-type PC 40.

The floppy disk expansion unit 60 contains a floppy disk drive unit comprising a turntable 62 and a magnetic head 63, with an insertion opening 64 provided on an X2 side of the floppy disk expansion unit 60. Similarly, a tray unit 74 is provided on the CD-ROM expansion unit 70 and contains a CD-ROM drive unit comprising a turntable 72 and an optical head 73.

When the operator wishes to use a floppy disk drive with the laptop-type PC 40, the operator inserts the floppy disk expansion unit 60 into the interior of the expansion bay 46 and connects the connector 61 to the connector 49. In so doing, the laptop-type PC 40 is equipped with a floppy disk drive. A floppy disk 65 is inserted through the insertion opening 64 and into the interior of the floppy disk expansion unit. The CPU 45 is then able to access the floppy disk drive unit through the connector 49.

When the operator wishes to use a CD-ROM drive with the laptop-type PC 40, the operator inserts the CD-ROM expansion unit 70 into the expansion bay 46 and connects the connector 71 to the connector 49. In so doing, the laptop-type PC 40 is equipped with a CD-ROM drive. The tray unit 74 is pulled out, a CD-ROM 75 is set on the turntable 72 and the tray unit is pushed in, allowing the information recorded on the CD-ROM to be read. As described above, the CPU 45 is then able to access the CD-ROM drive unit via the connector 49.

It will be appreciated that information is written to and read from the expansion unit mounted in the expansion bay 46 via the connector 49. Similarly, data transmission and reception takes place across the connector 49.

Additionally, it should be noted that the expansion bay 46 is called by a variety of names, such as bay, expansion bay slot, multi-bay, multipurpose bay and so forth.

A description will now be given of a CCD imaging device unit 80, with reference to FIGS. 5, 6, 7 and 8.

Figure 5:
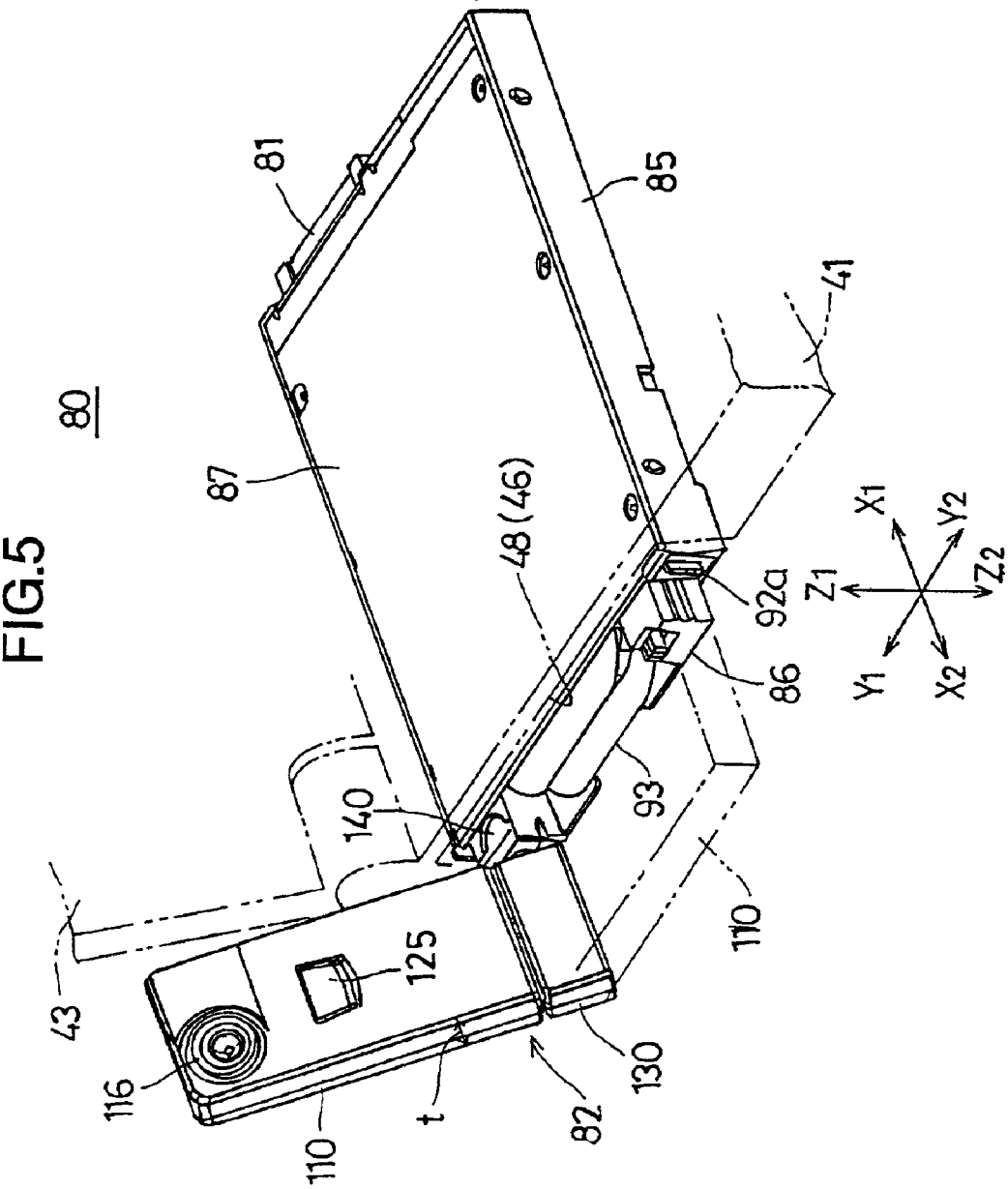
FIG. 5 is a diagram showing a CCD imaging device expansion unit according to a first embodiment of the present invention.
Figure 6:
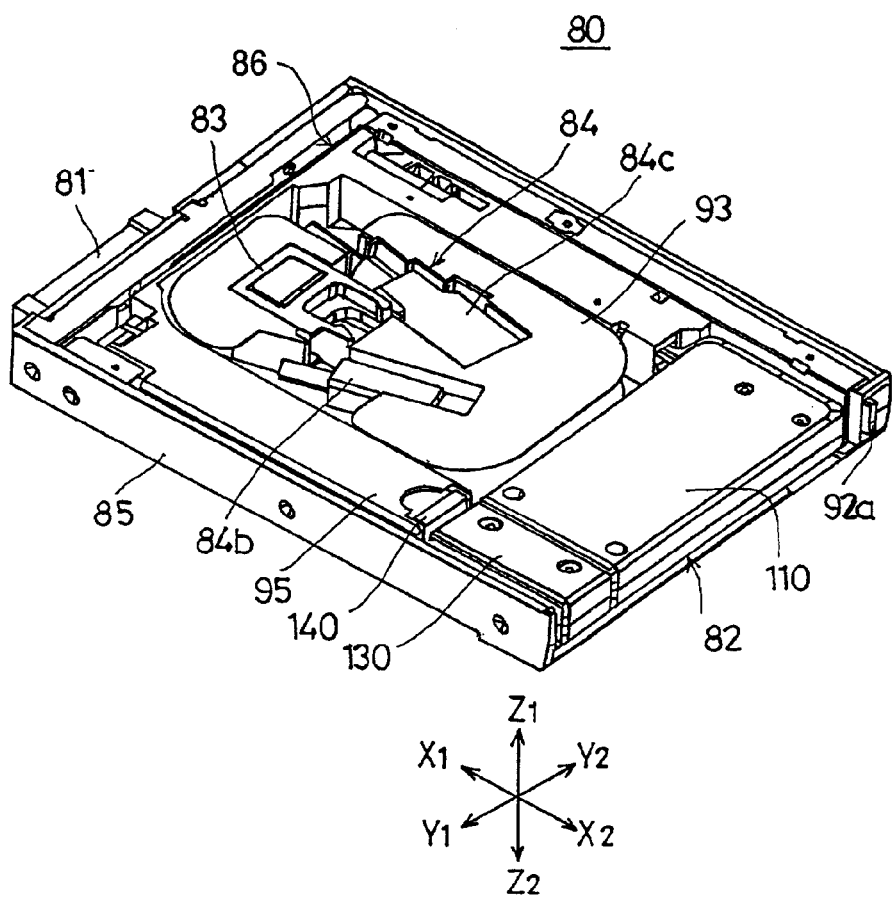
FIG. 6 is a diagram showing a CCD imaging device expansion unit with a top cover removed.
Figure 7:
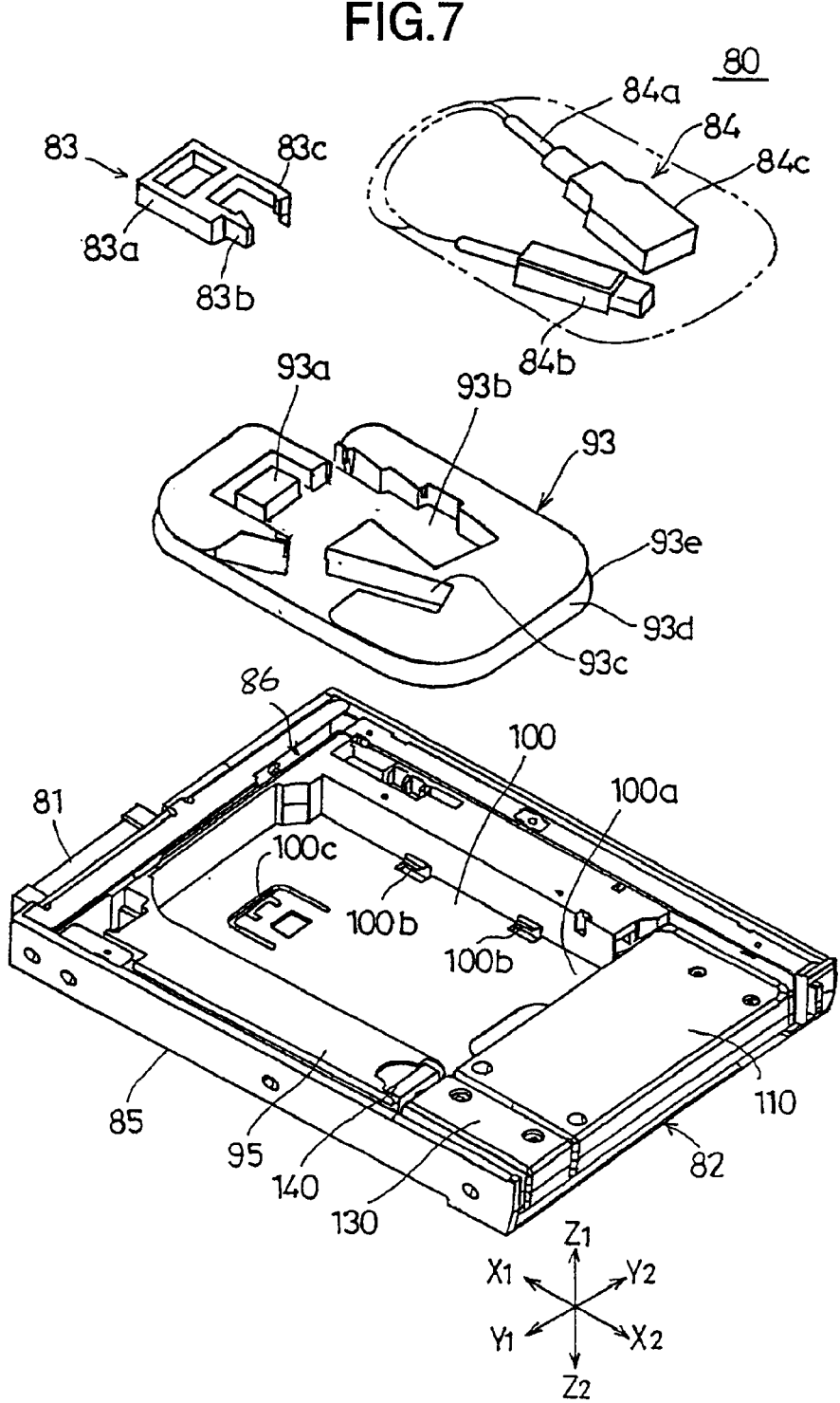
FIG. 7 is a diagram showing an exploded view of a portion of the CCD imaging device expansion unit.
Figure 8:
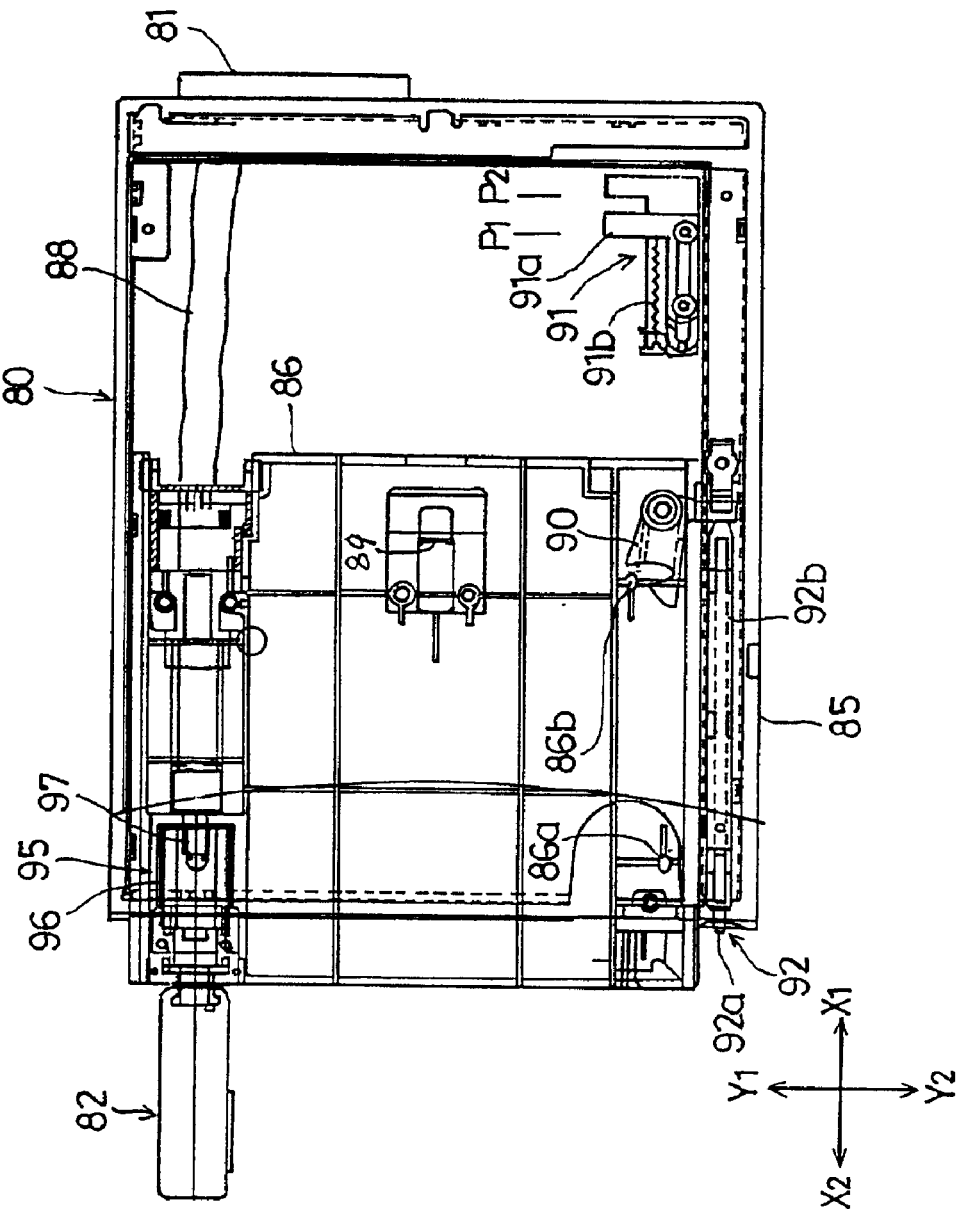
FIG. 8 is a diagram showing a plan view of the CCD imaging device expansion unit in the state shown in FIG. 5, with the top cover and holder removed.

FIG. 5 is a diagram showing a CCD imaging device expansion unit according to a first embodiment of the present invention. FIG. 6 is a diagram showing a CCD imaging device expansion unit with a top cover removed. FIG. 7 is a diagram showing an exploded view of a portion of the CCD imaging device expansion unit. FIG. 8 is a diagram showing a plan view of the CCD imaging device expansion unit in the state shown in FIG. 5, with the top cover and holder removed.

A CCD imaging device expansion unit 80, like the floppy disk expansion unit 60 and the CD-ROM expansion unit 70, is provided as an accessory unit for the laptop-type PC 40. The CCD imaging device expansion unit 80, like the floppy disk expansion unit 60 and the CD-ROM expansion unit 70, has a flat shape so as to be passed through the opening 48 and inserted into the interior of the expansion bay 46. In addition, the CD imaging device expansion unit 80 comprises a connector 81 which, like connectors 61, 71 described above, is disposed on a front edge of an X1 side of the CCD imaging device expansion unit 80 when the CCD imaging device expansion unit 80 is inserted into the expansion bay 46. The CCD imaging device expansion unit 80 further comprises a CCD imaging device 82, a supporting member 83 and a connector cable 84.

The CCD imaging device expansion unit 80 is inserted into the expansion bay 46 and the connector 81 is connected to the connector 49 whenever the operator wishes to send images taken with the CCD imaging device via e-mail or to receive images so sent and to process the images using a software program, such as, for example, a retouching program. By so doing, the CPU 45 is able to access the CCD imaging device expansion unit 80 and images can be input from the CCD imaging device 82 into the CPU 45.

Referring to FIGS. 5, 6, 7 and 8, it can be appreciated that the CCD imaging device expansion unit 80 comprises a housing 85, a tray 86 provided on top of the housing 86 and movable in the X1, X2 direction, a cover 87 fixedly mounted on the housing and covering the tray 86, the CCD imaging device 82, a holder 93, the supporting member 83 and the connector cable 84.

As shown in FIG. 8, the housing 85 comprises a substantially L-shaped lock lever 90, a tray extension mechanism 91, a tray extension lever 91a, and a tension coil spring 91b that urges the tray extension lever 91a in the X2 direction. The tray extension lever 91a moves between positions P1 and P2. In addition, an operating knob mechanism 92 comprises a pushbutton 92a and a lever 92b for transmitting the pushing operation of the pushbutton 92a to the lock lever 90.

A first lock pin member 86a and a second lock pin member 86b are formed on a bottom surface of the tray 86. The tray 86 is moved in the X1 direction to a maximum position as shown in FIG. 5 and in that maximum position the first lock pin member 86a engages the lock lever 90 and is locked. The tray extension lever 91a is pushed by the tray 86 to position P2.

Tray 86 has a connector 95 on an X2 side of the tray extending along a Y1 edge of the tray. The connector 95 comprises a rectangular box-like opening 96 on the X2 side and a male connector part 97 inside the box-like opening 96. The male connector part 97 is connected to the connector 81 described above via a flat cable 88.

Additionally, as shown in FIG. 7, a concave holder storage compartment 100 for holding the holder 93 is formed in a top surface of the tray 86. The holder storage compartment 100 has an opening 10a on the X2 side for inserting and removing the holder 93, guides 100b on the Y1 and Y2 sides of the holder storage compartment 100, and a click lock 100c for locking the holder 93 in place. The opening 100a opens when the CCD imaging device 82 is swung vertically into position and opens also when the CCD imaging device 82 is detached from the expansion unit 80.

A convexity 93a and first and second concavities 93b and 93c, respectively, are formed on an upper surface of the holder 93. A peripheral section 93d around which a cable is wound is formed on a periphery of the holder 93.

The supporting member 83 comprises a rectangular frame 83a and two legs 83b, 83c. The connector cable 84 comprises a cable 84a of predetermined length, with a connector 84b provided at one end of the cable 84a and a USB connector 84c provided at the other end of the cable 84a.

The CCD imaging device 82 is connected to the connector 95 described above via a connector 140 to be described later, and is detachably supported at the X2 side edge of the tray 86.

As shown in FIG. 6, the supporting member 83 is supported at the convexity 93a, the cable portion 84a of the connector cable 84 is wound around the peripheral section 93d described above, the connector 84b is engaged and supported by the second concavity 93c and the USB connector 84c is engaged and supported by the first concavity 93b. The holder 93 is inserted into the interior of the holder storage compartment 100 from the opening 10a toward the X1 side, in such a way that an edge of a bottom flange 93e shown in FIG. 7 passes beneath the guides 100b and the holder 93 is locked in place by the click lock 100c.

It will be appreciated that a thickness t of the CCD imaging device 82 is thin enough so that, as shown in FIG. 6, the CCD imaging device 82 can be inserted into the housing 85 when lowered to a horizontal state.

A description will now be given of the CCD imaging device 82, with reference to FIGS. 9, 10, 11, 12, 13 and 14.

Figure 9:
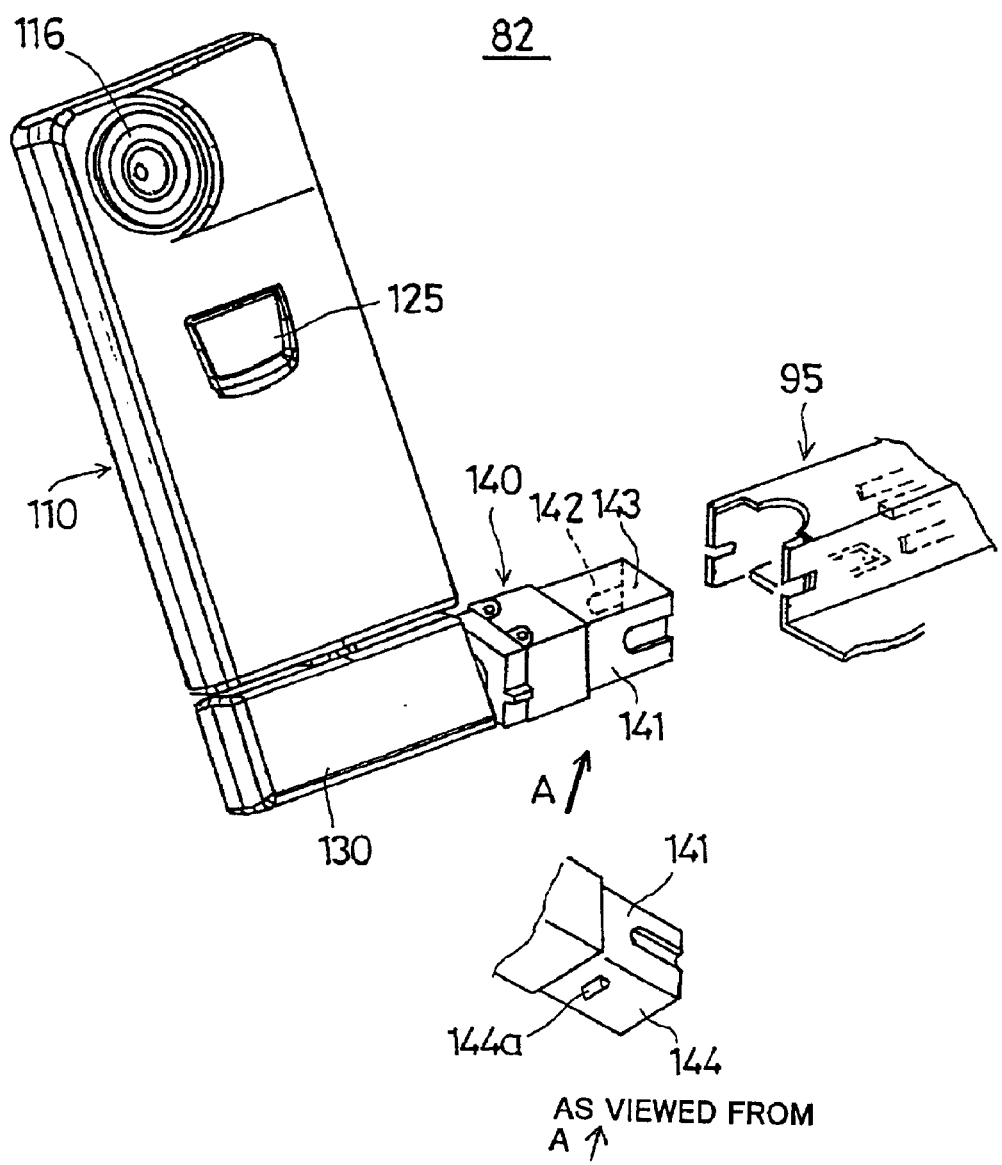
FIG. 9 is a diagram showing the CCD imaging device together with a tray-side connector.
Figure 10A:
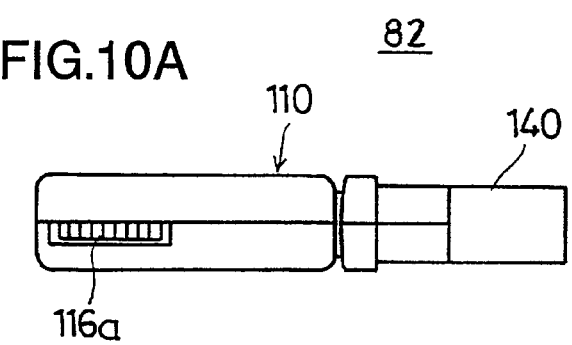
FIGS. 10A, 10B and 10C are diagrams showing top, front and side views of the CCD imaging device.
Figure 10B:
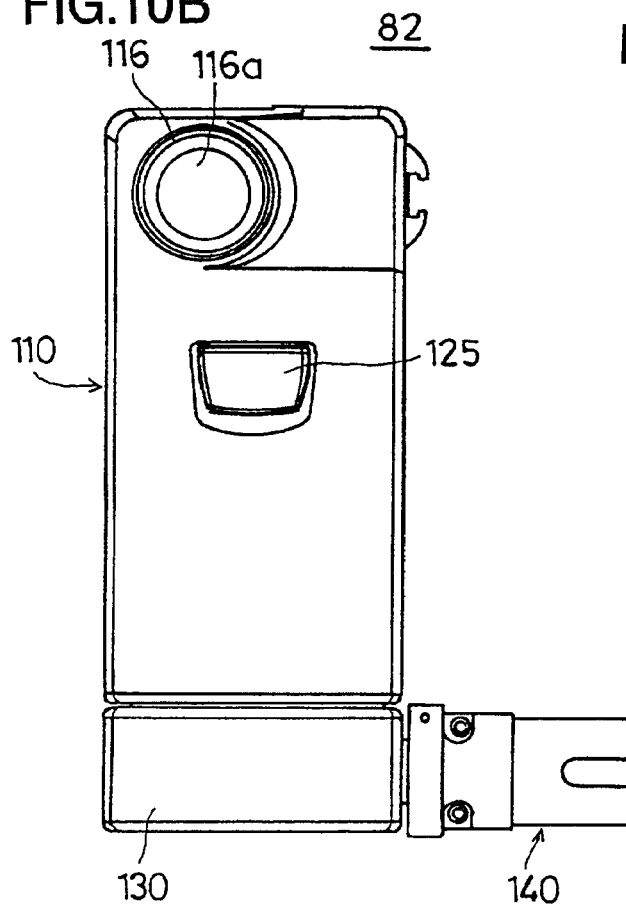
Figure 10C:
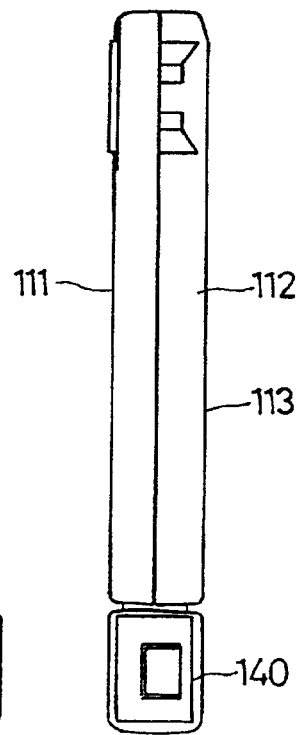
Figure 11A:
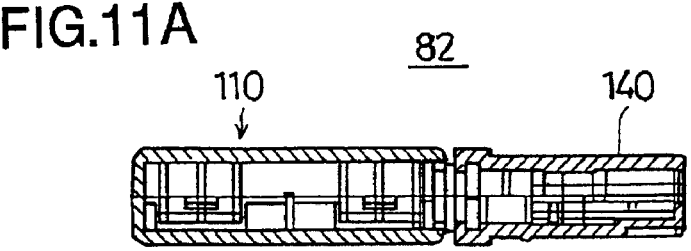
FIGS. 11A, 11B and 11C are diagrams showing cross-sectional top, front and side views of the CCD imaging device.
Figure 11B:
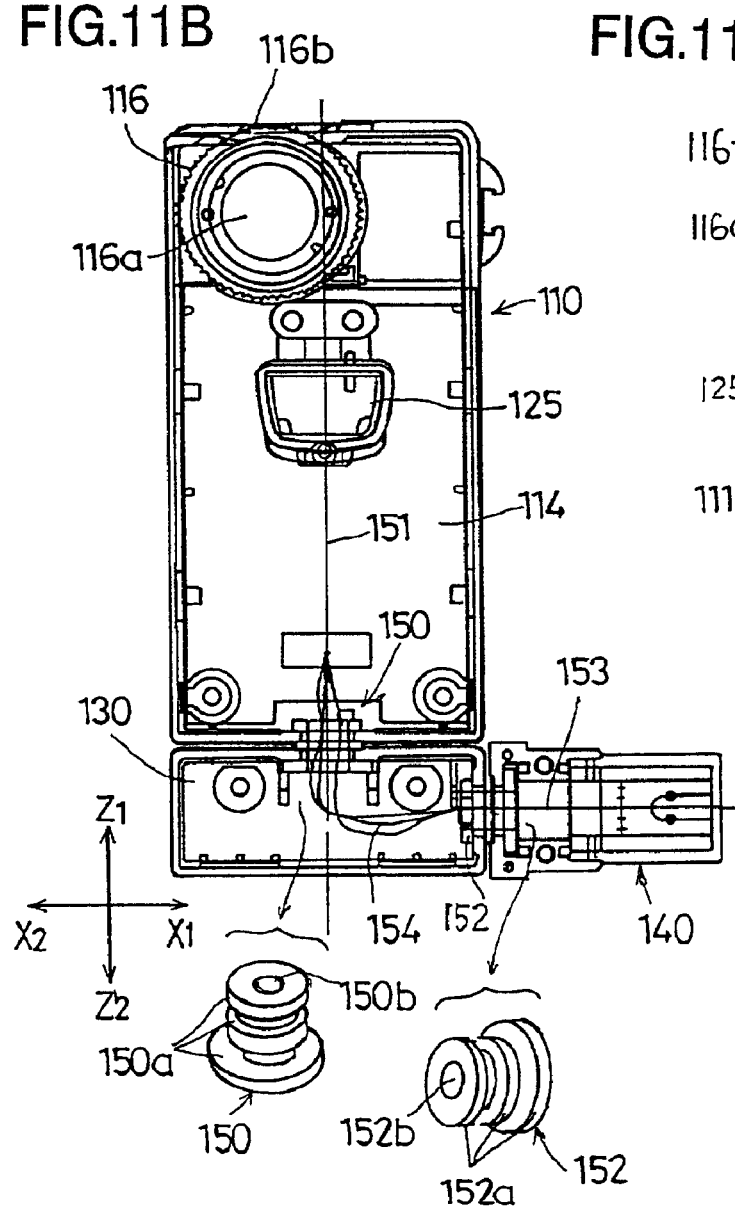
Figure 11C:
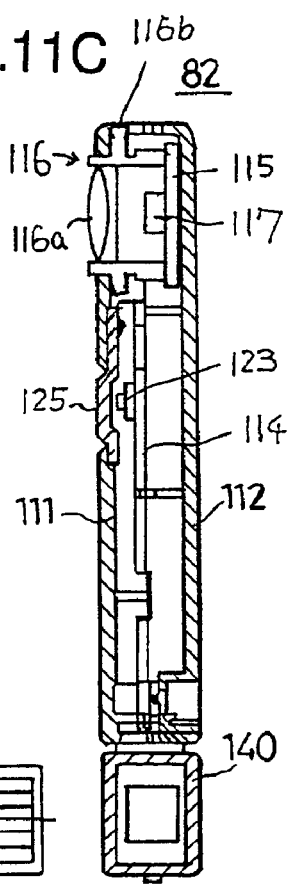
Figure 12A:
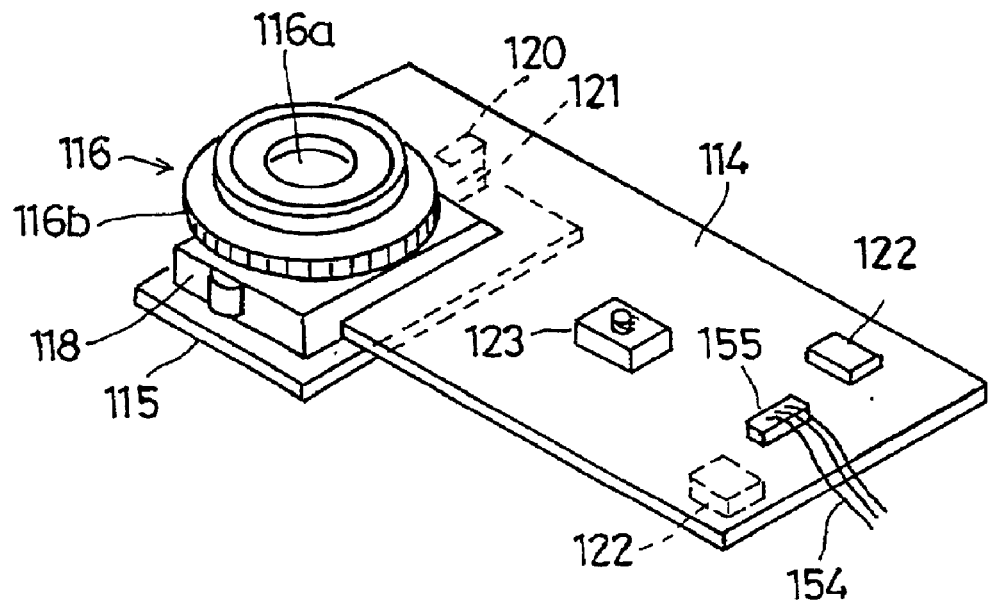
FIGS. 12A and 12B are diagrams showing perspective and side views of the internal structure of the CCD imaging device.
Figure 12B:
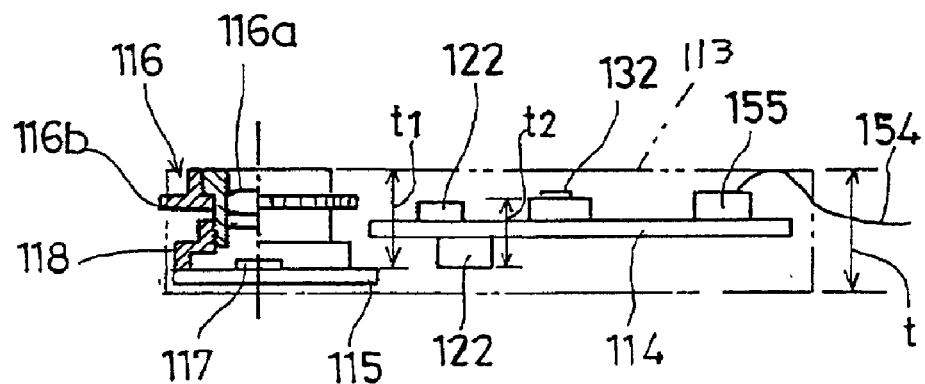
Figure 13:
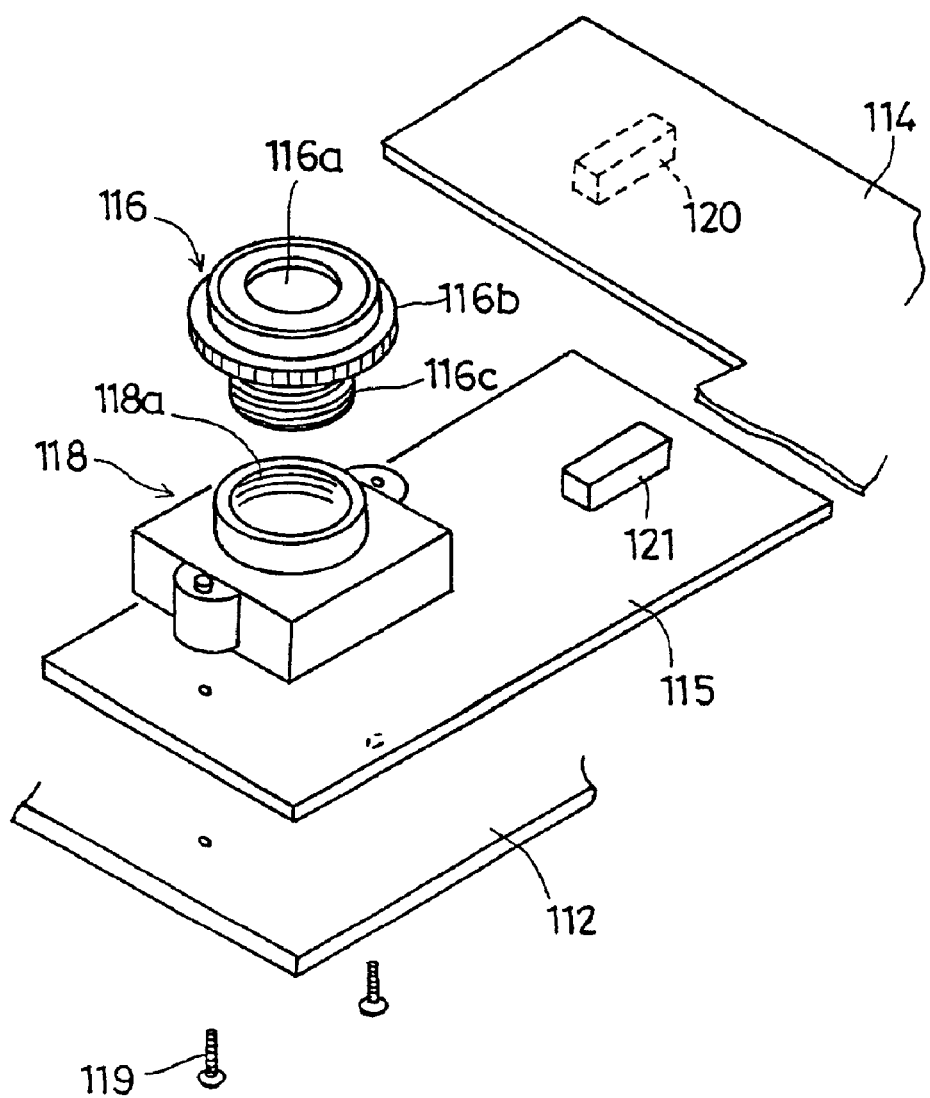
FIG. 13 is a diagram showing an exploded perspective view of the lens and surrounding portion of the CCD imaging device of FIGS. 12A, 12B.
Figure 14:
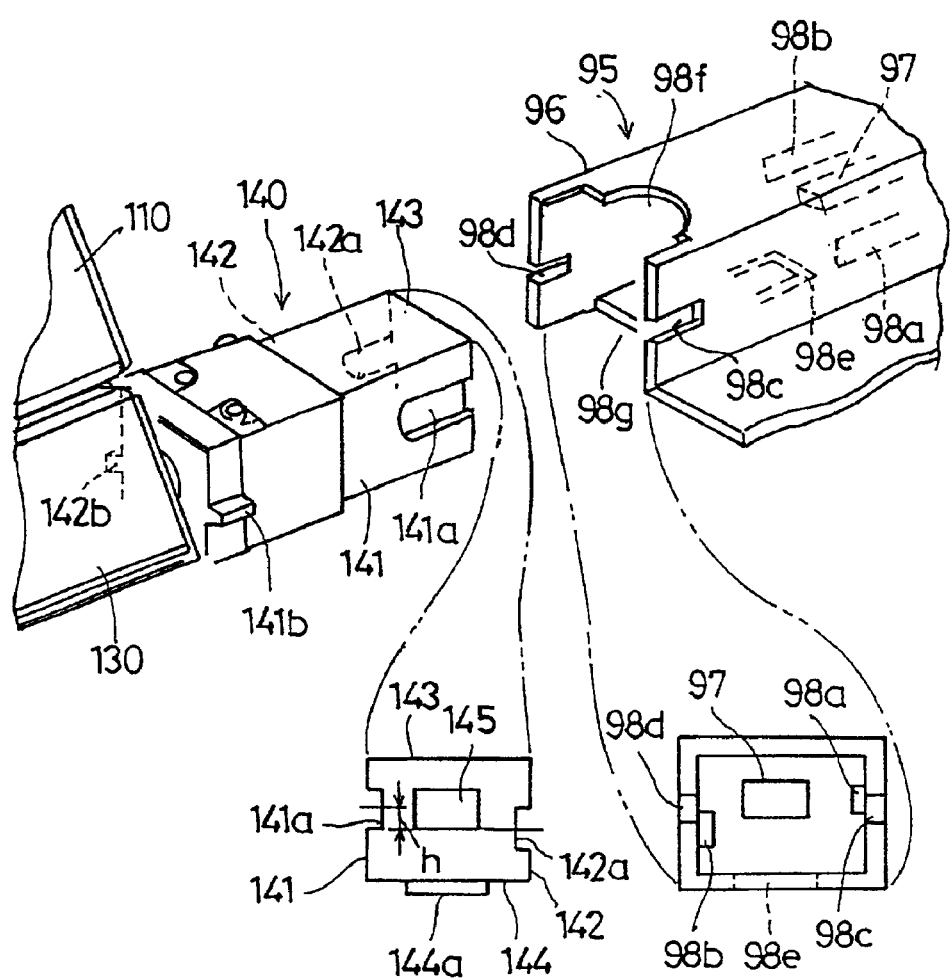
FIG. 14 is a diagram showing the CCD imaging device connector and the tray connector.

FIG. 9 is a diagram showing the CCD imaging device together with a tray-side connector. FIGS. 10A, 10B and 10C are diagrams showing top, front and side views of the CCD imaging device. FIGS. 11A, 11B and 11C are diagrams showing cross-sectional top, front and side views of the CCD imaging device. FIGS. 12A and 12B are diagrams showing perspective and side views of the internal structure of the CCD imaging device. FIG. 13 is a diagram showing an exploded perspective view of the lens and surrounding portion of the CCD imaging device of FIGS. 12A and 12B. FIG. 14 is a diagram showing the CCD imaging device connector and the tray connector.

The CCD imaging device 82 comprises a body 110, a base member 130 and a connector 140. The body 110 is disposed atop the base member 130 and the connector 140 is positioned at one side of the base member 130.

The CCD imaging device 82 body 110 has a flattened substantially rectangular shape and, as shown in FIG. 11B, is rotatably connected to the base member 130 by a substantially cylindrical connecting member 150 comprising a three-step flange portion 150a so as to rotate about an axis 151 that is also a center line of the body 110 of the CCD imaging device 82. Similarly, the connector 140, as shown in FIG. 11B, is rotatably connected to the base member 130 by a substantially cylindrical connecting member 152 comprising a three-step flange portion 152a so as to rotate about an axis 153 that is also the X axis. A cable 154 extended from the body 110 of the CCD imaging device 82 passes in succession through a central aperture 150b of the connecting member 150, the interior of the hollow base member 130 and a central aperture of the connecting member 152, and is connected to the connector 140.

As will be described later, in such a structure, the body 110 of the CCD imaging device 82 can be panned as well as tilted. In addition, the base member 130 and the connector 140 have a thickness identical to a thickness of the body 110 of the CCD imaging device 82 when the body 110 of the CCD imaging device 82 is lowered to a horizontal position in preparation for storage inside the case.

The body 110 of the CCD imaging device 82 is constructed so that a first printed circuit board 114, a second printed circuit board 115, a lens unit 116 and a CCD holder 118 are contained within a flattened substantially rectangular housing 113 comprising an upper half 111 and a lower half 112.

In particular, as shown in FIGS. 12 and 13, the first printed circuit board 114 is disposed at a position at which the upper half 111 and the lower half 112 meet. The second printed circuit board 115 is disposed on a top surface of the lower half 112.

The CCD holder 118 supports the CCD 117 and is fixedly mounted on the lower half 112 together with the second printed circuit board 115 by a screw 119. Additionally, the lens unit 116 comprises a central lens 116a and a peripheral focus knob 116b as well as a male screw portion 116c on a lower side. The male screw portion 116c is screwed into a female thread portion 118a located on the CCD holder 118, thus mounting the lens unit 116 on the CCD holder 118.

The first printed circuit board 114 and the second printed circuit board 115 overlap and are connected to each other at the overlapping section by connectors 120, 121.

Electronic components 122 are mounted on the top and bottom surfaces of the first printed circuit board 114, with a capture switch 123 mounted on a top surface thereof. A connector 155 of the cable 154 described above is connected to the top surface of the first printed circuit board 114.

As shown in FIG. 12B, a thickness t2 of the first printed circuit board 114 including the mounted electronic components 122 is less than a height t1 of the combined lens unit 116 and CCD holder 118 assembly. In other words, such a structure is more compact than a structure in which the combined lens unit 116 and CCD holder 118 assembly is mounted on top of the first printed circuit board 114. As a result, the body 110 of the CCD imaging device 82 can be made thinner than the conventional art.

In addition, the focus adjustment knob 116b does not project above or otherwise add to a height (thickness) of the lens unit 116 but is provided at an intermediate point in a height (thickness) direction of the lens unit 116. Here, too, such a structure makes it possible to make the body 110 of the CCD imaging device 82 thinner than the conventional art.

Figure 1:
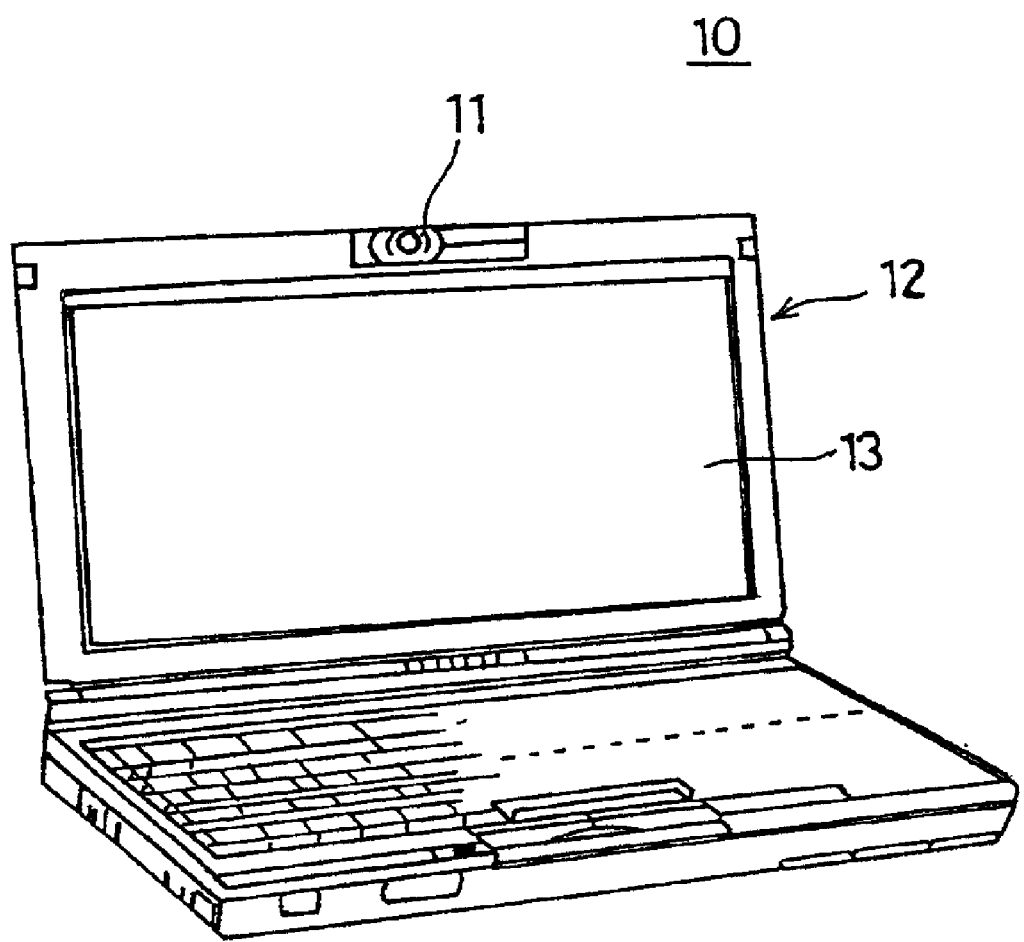
FIG. 1 is a diagram showing one example of the conventional art.
Figure 2:
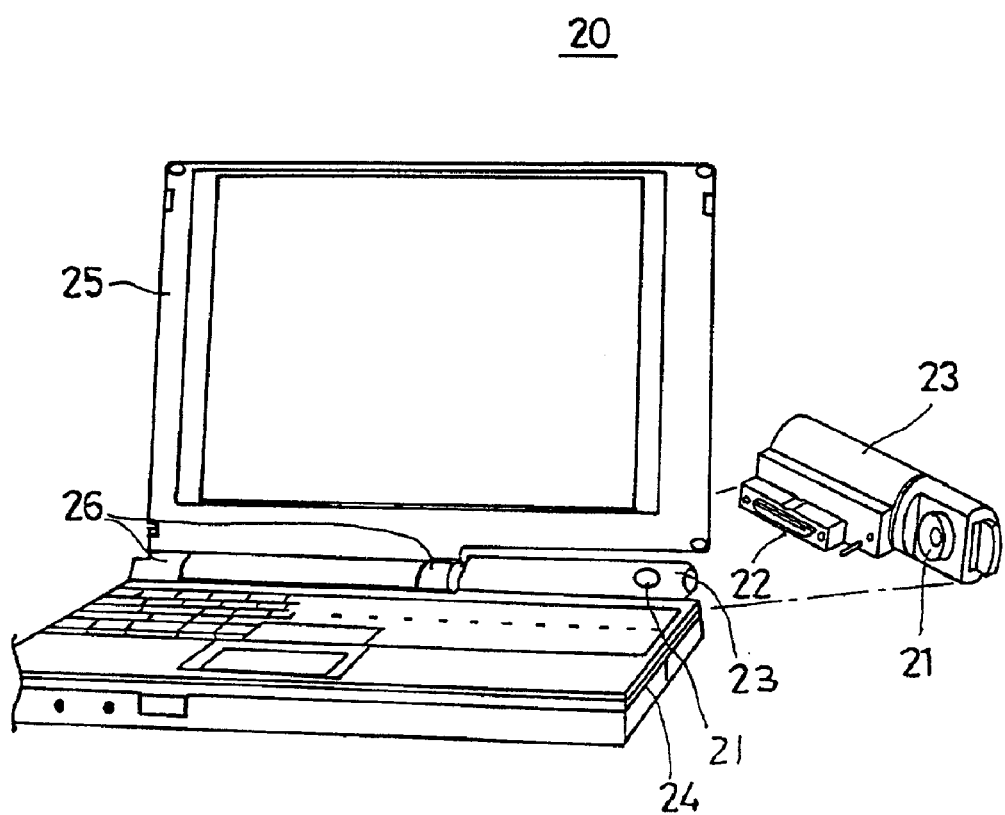
FIG. 2 is a diagram showing another example of the conventional art.
Figure 3:
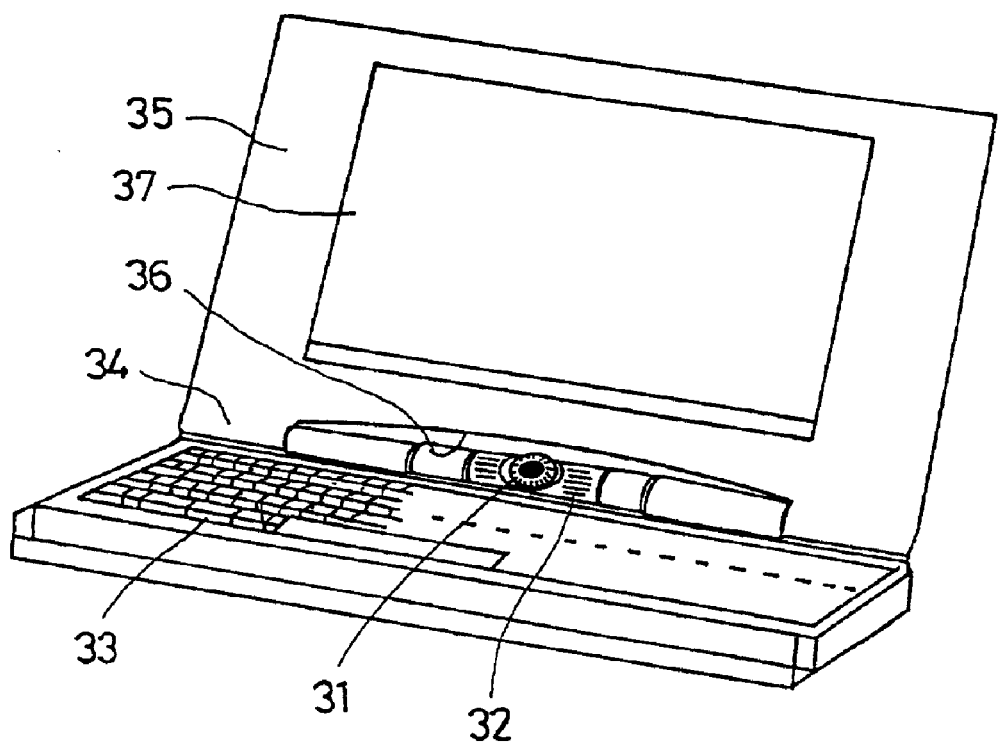
FIG. 3 is a diagram showing still another example of the conventional art.

As shown in FIG. 1C, a capture button 125 is disposed opposite the capture switch 123, so that a back surface of the upper half 111 is mounted in a cantilevered state. The capture button 125 is positioned at approximately the center of a front surface of the body 110 of the CCD imaging device 82, and is operated by being pressed using the thumb of the left hand, the left hand grasping the body 110 of the CCD imaging device 82.

The focus knob 116b is disposed so as to be exposed at a side of the housing 85, so the focus knob 116b can be operated without the operator's hand getting in the way of the lens unit.

The base member 130 is an empty rectangular box, with the connector 140 rotatably supported on one end in a longer direction of the box. The connector 140 rotatably supports the CCD imaging device 82 body 110.

A description will now be given of the connector 140 in conjunction with the tray side connector 95, with reference to FIG. 14.

The connector 140 has a substantially rectangular shape, with side surfaces 141, 142, an upper surface 143, a lower surface 144 and a female connector part 145. A groove 141a is formed at a forward edge of the side surface 141 and a tab portion 141b is formed on a base edge opposite the forward edge of the side surface 141. Similarly, a groove 142a is formed on a forward edge of the side surface 142 disposed opposite the side surface 141, with a tab 142b formed on a base edge opposite the forward edge of the side surface 142. The grooves 141a and 142a are provided to prevent improper connection and, as shown in FIG. 14, are provided at a height differential shown as h. As shown in FIG. 14 together with FIG. 9, a click lock projection 144a is formed on the lower surface 144.

The tray side connector 95 is built to accommodate the connector 140. As described above, the tray side connector 95 comprises a rectangular box 96 and a male connector part 97 inside the box 96 that is paired with the female connector part 145 described above. Tabs 98a and 98b are formed on left and right side surfaces of the rectangular box 96 and accommodate the above-described grooves 141a and 142a, respectively, with similarly formed slits 98c and 98d accommodating the above-described tabs 141b and 142b, respectively. A click lock 98e is formed in a bottom panel of the rectangular box 96 and accommodates the click lock projection 144a described above. Notches 98f and 98g are cut into the top and bottom panels at the opening to the rectangular box 96 in order to provide fingerholds.

A description will now be given of a usage state of the CCD imaging device expansion unit 80, with reference to FIGS. 15, 16, 17, 18, 19, 20A, 20B and 21.

Figure 15:
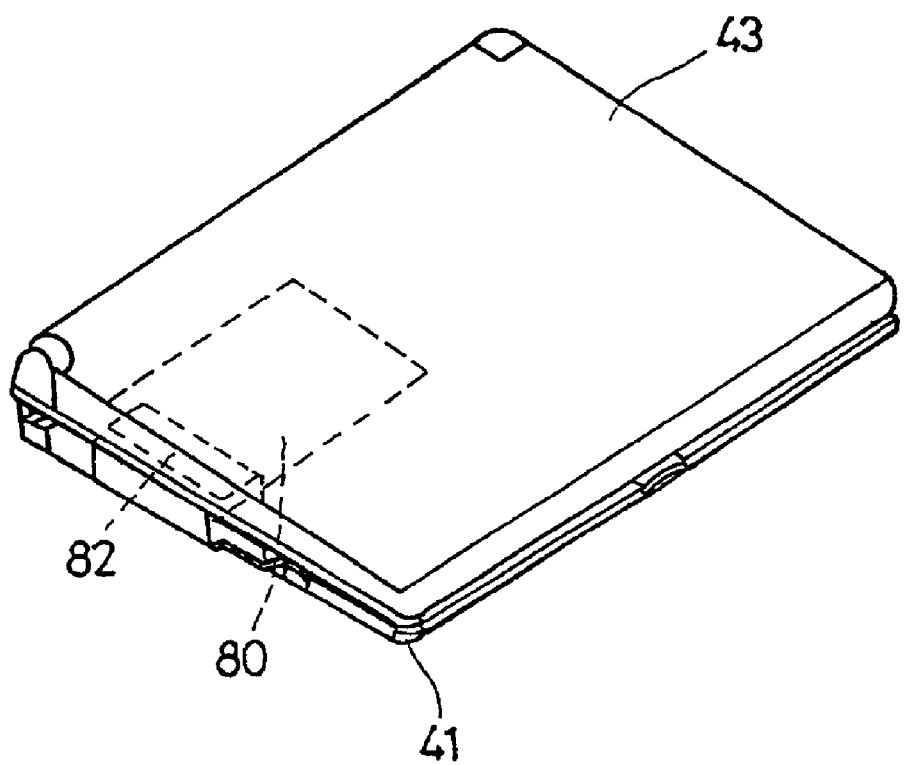
FIG. 15 is a diagram showing a laptop-type PC in a portable state.
Figure 16:
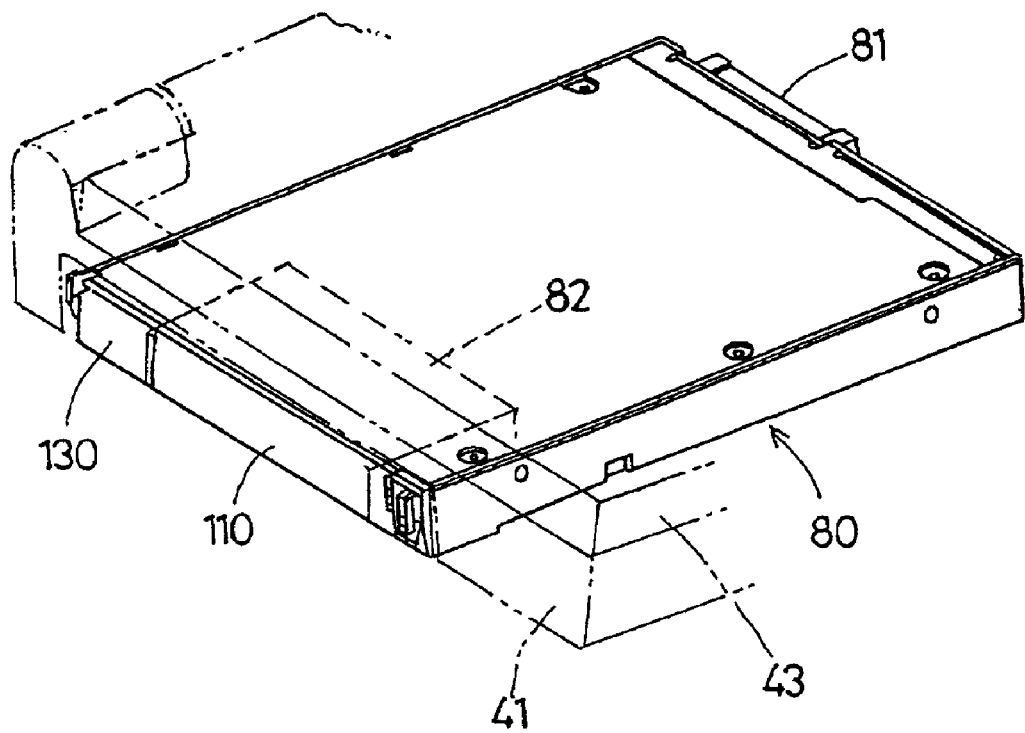
FIG. 16 is a diagram showing the CCD imaging device of FIG. 15 in a stored state.
Figure 17:
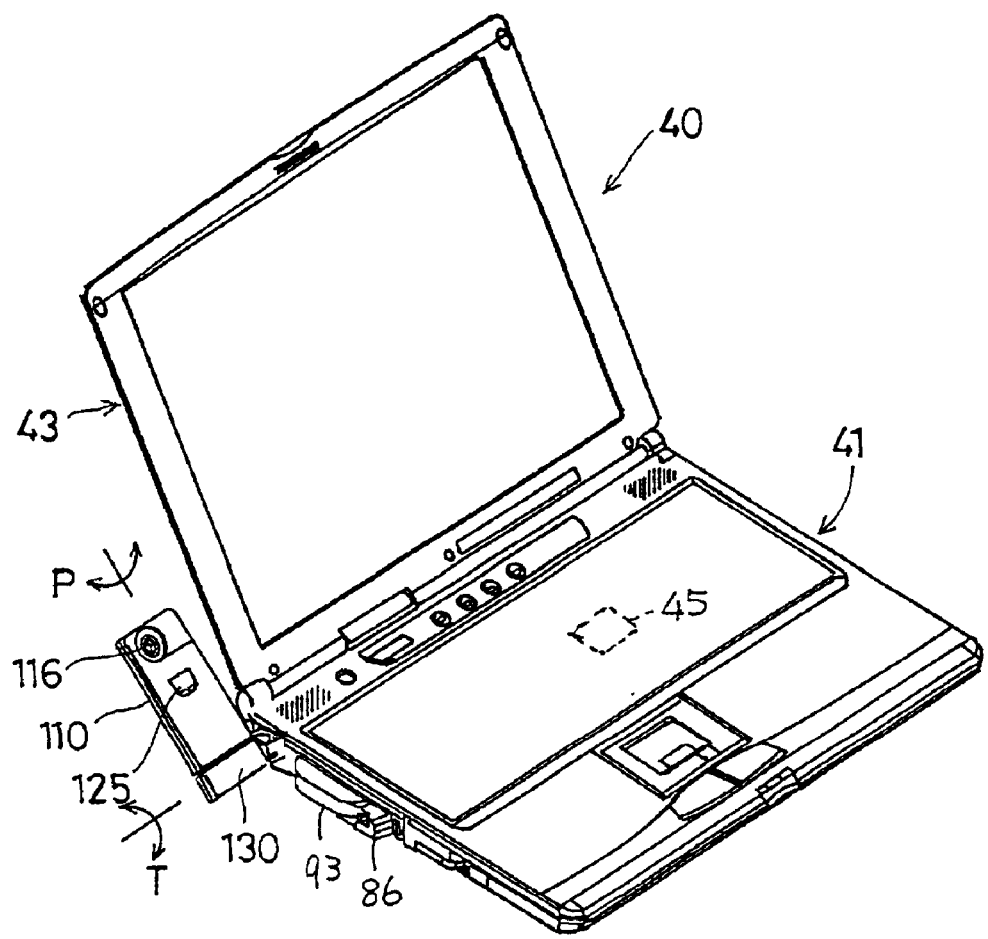
FIG. 17 is a diagram showing the CCD imaging device in a first usage state.
Figure 18:
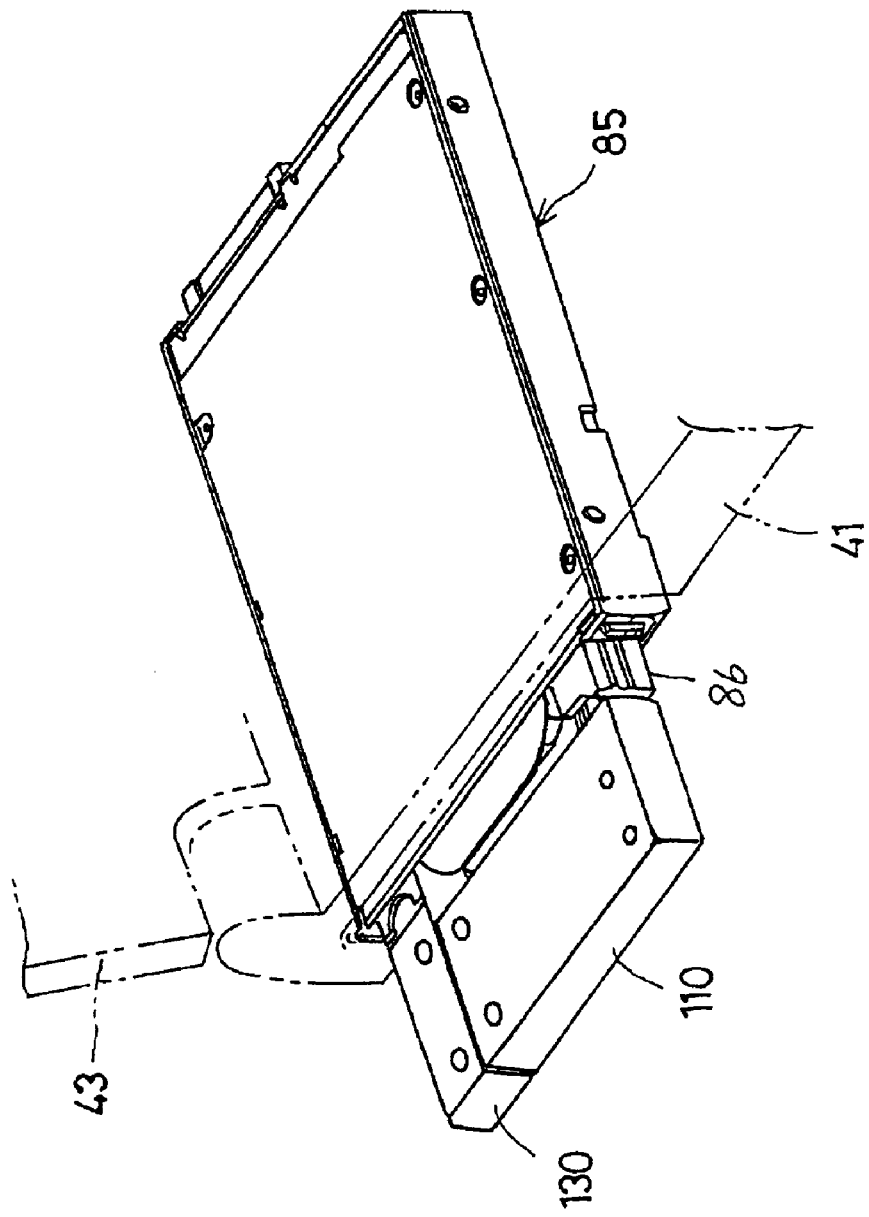
FIG. 18 is a diagram showing the CCD imaging device in an intermediate position of first use.
Figure 19:
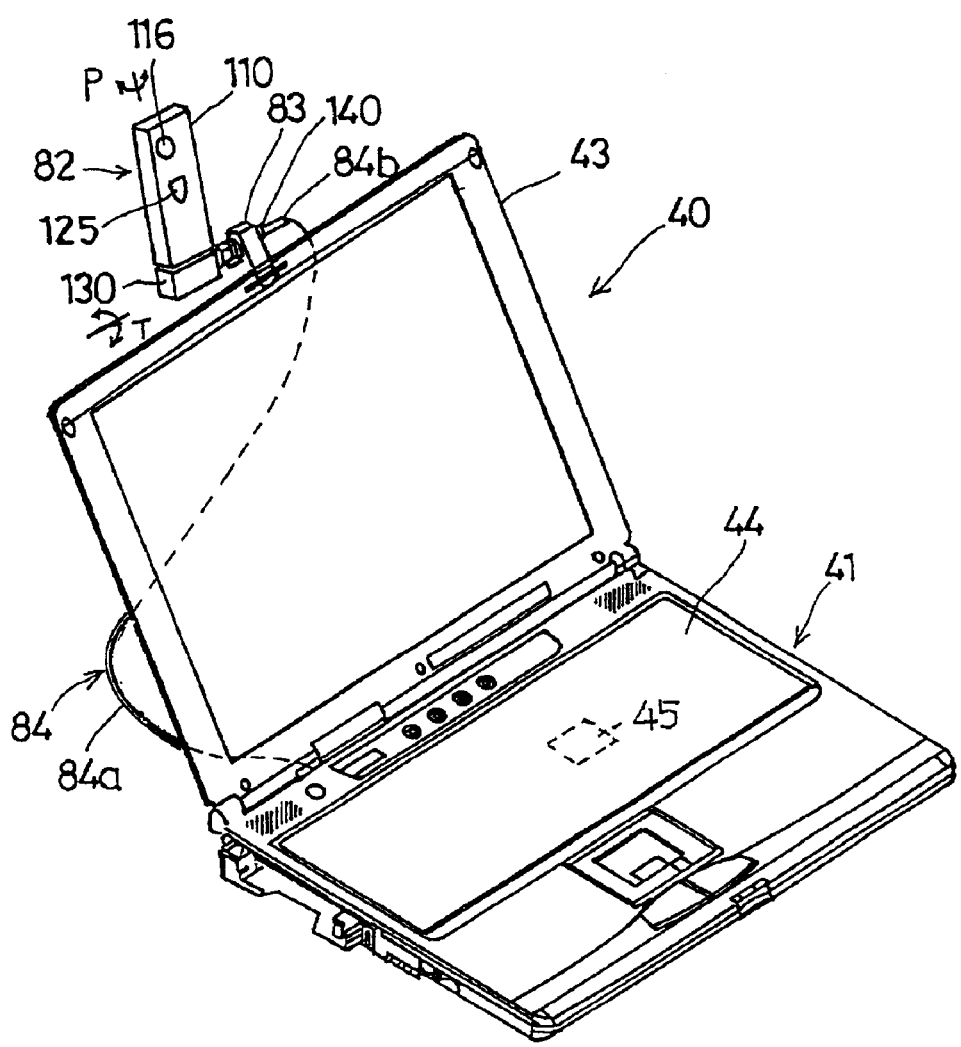
FIG. 19 is a diagram showing the CCD imaging device in a second usage state.
Figure 21:
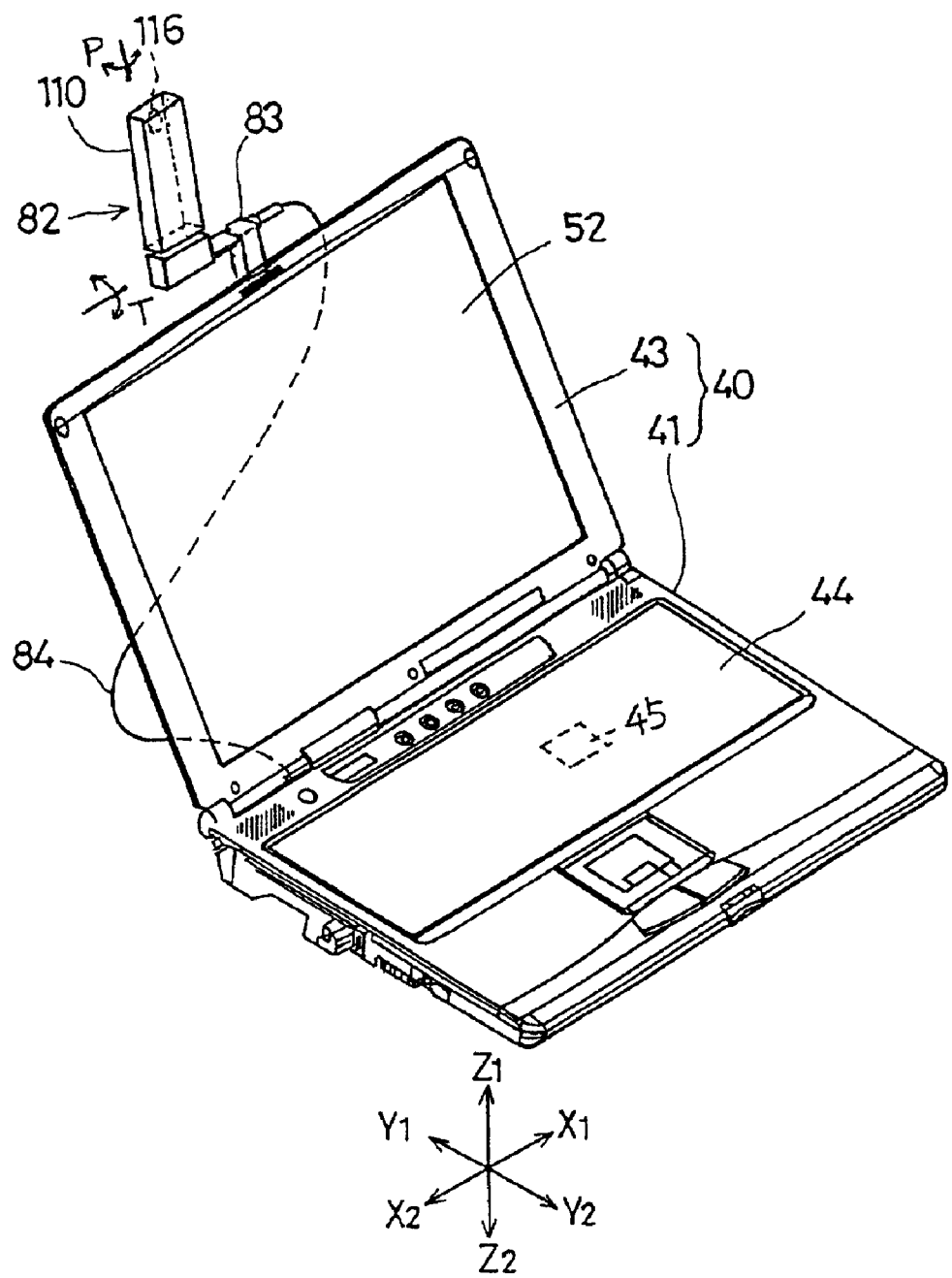
FIG. 21 is a diagram showing a variation of the CCD imaging device in a second usage state.

FIG. 15 is a diagram showing a laptop-type PC in a portable state. FIG. 16 is a diagram showing the CCD imaging device of FIG. 15 in a stored state. FIG. 17 is a diagram showing the CCD imaging device in a first usage state. FIG. 18 is a diagram showing the CCD imaging device in an intermediate position of first use. FIG. 19 is a diagram showing the CCD imaging device in a second usage state. FIGS. 20A and 20B are diagrams showing front and side views of the CCD being supported in a second usage state. FIG. 21 is a diagram showing a variation of the CCD imaging device in a second usage state.

A description will first be given of a first state in which the laptop-type PC 40 is being transported.

As shown in FIG. 6, the CCD imaging device expansion unit 80 is constructed in such a way that the CCD imaging device 82 can be contained within the housing 85. The laptop-type PC 40, as shown in FIGS. 15 and 16, is constructed so that the display unit 43 can be closed and the CCD imaging device expansion unit 80 can be inserted into the expansion bay 46. In such a state the laptop-type PC 40 can be carried about. It will be noted that the CCD imaging device 82 is contained within the housing 85 and thus does not project from the expansion bay 46. Accordingly, the CCD imaging device 82 is contained within the interior of the laptop-type PC 40, out of the way and convenient for transport.

Next, a description will be given of a second state in which the CCD imaging device 82 is in use. In actuality, the following two usage states are possible.

Usage state 2-1. The CCD imaging device 82 remains mounted on the laptop-type PC 40, in a first usage state shown in FIGS. 17 and 18.

In the state shown in FIG. 15, first the display unit 43 is opened and the pushbutton 92a described above is pressed firmly, which rotates the lock lever 90 shown in FIG. 8, releasing the first lock pin member 86a and causing a portion of the tray 86 to be pushed outward in the X2 direction by the tray extension mechanism 91 described above. Next, the operator grasps the part projecting from the left side of the laptop-type PC 40 main unit 41 and pulls the tray 86 outward to the position shown in FIG. 8. In so doing, as shown in FIG. 18, the tray 86 is extracted up to a position at which the tray 86 is engaged by the stopper 89, such that the CCD imaging device 82, which is lying flat, is extended from the left side of the laptop-type PC 40 main unit 41.

Next, the operator grasps the CCD imaging device 82 body 110 and rotates the body 110 so that the body 110 is roughly vertical. The CCD imaging device 82 can be tilted and panned in the directions indicated by arrows T and P, respectively, in FIGS. 5 and 17.

The operator operates the CCD imaging device 82 by grasping the CCD imaging device 82 body 110 with the left hand and pressing the capture button 125 with the thumb of the left hand. It will be appreciated that the capture button 125 is conveniently located beneath the thumb for that purpose. It will be further appreciated that the PC main unit 41 need not be moved in order to acquire an image because the CCD imaging device 82 can be tilted and/or panned in the desired direction.

Further, the first usage state as described above is characterized by three distinctive features, as follows.

First, the CCD imaging device 82 is electrically connected to the PC main unit 41 via the connector 140, the tray side connector 95, a cable 98, the connector 81 and the connector 49, and is used in a state in which the CCD imaging device 82 projects from the PC main unit 41.

In this case, the CPU 45 inside the PC main unit 41 can access the CCD imaging device 82 via the connector 81 and the connector 49.

Second, the connector 140 and the connector 95 are mechanically joined at an appropriate strength not only by the engagement of the female connector part 145 and the male connector part 97 but also by the click lock projection 144a and the click lock member 98e and further by the engagement of the tabs 141b, 142b and the slits 98c, 98d. The base member 130 connecting member for the connector 140 has no play but is instead appropriately snug, as is the CCD imaging device 82 body 110 connecting member for the base member 130. Accordingly, the CCD imaging device 82 body 110 is firmly and stably supported on the PC main unit 41.

Third, as described previously, the operator operates the CCD imaging device 82 by simply grasping the body 110 with the left hand and pressing the operating button 125 with the thumb of the left hand. Operation is thus simple and easy.

Usage state 2-2. The CCD imaging device 82 is detached from the CCD imaging device expansion unit 80 and supported on the laptop-type PC 40, as shown in FIGS. 19, 20A, 20B and 21.

In the state shown in FIG. 17, the operator grasps the CCD imaging device 82 and pulls it firmly in the X2 direction, pulls the connector 140 from the connector 95 and detaches the CCD imaging device 82 from the CCD imaging device expansion unit 80, that is, from the PC main unit 41.

Next, the operator grasps the tip of the holder 93 and pulls it firmly in the X2 direction, thus detaching the holder from the CCD imaging device expansion unit 80. Next, the supporting member 83 and a connector cable 84 are removed from the detached holder 93.

As shown in FIGS. 20A and 20B, the supporting member 83 engages the connector 140 of the CCD imaging device 82. Additionally, the two legs 83b, 83c of the supporting member 83 are mounted so as to straddle the front edge of the display unit 43. Leg 83b engages a hole 53a in the locking mechanism 53 provided on the center of the front edge of the display unit 43 as described above. By these means the CCD imaging device 82 is mounted on and supported by the front edge of the display unit 43.

Next, the connector 84b at one end of the connector cable 84 is connected to the connector 140 of the CCD imaging device 82 and the USB connector 84c at the other end of the connector cable 84 is connected to USB connector 51 located on the rear of the PC main unit 41. These connections electrically connect the CCD imaging device 82 to the PC main unit 41 via the connector cable 84, so that the CPU 45 within the PC main unit 41 can access the CCD imaging device 82 via the USB connector 84c and the USB connector 51 on the rear of the PC main unit 41.

Next, the operator grasps the CCD imaging device 82 body 110 and tilts it in the direction of arrow T as appropriate and pans it in the direction of arrow P as appropriate. The operator uses the thumb of the left hand, with which the operator grasps the CCD imaging device 82 body 110, to press the capture button 125, thereby operating the CCD imaging device 82.

Once the above-described second usage state is concluded, the operator stores the supporting member 83 and the connector cable 84 in the holder 93, inserts the holder 93 in the CCD imaging device expansion unit 80, aligns the connector 140 of the CCD imaging device 82 with the connector 95 and firmly presses the connector 140 in the X1 direction. In this case, the second lock pin member 86b is engaged by the lock lever 90 so as to prevent the tray 86 from moving in the X1 direction, so the connector 140 is properly connected to the connector 95.

At approximately the same time that the CCD imaging device 82 is coupled to the tray 86, the pushbutton 92a is pushed. As shown in FIG. 8, the action of pushing the pushbutton 92a is communicated to the lock lever 90 via the lever 92b. When the lock lever 90 is moved the second lock pin member 86b, which is in a state of engagement with the lock lever 90, is released. Accordingly, by pushing the CCD imaging device 82 in the X1 direction, the tray 86 is moved to a final position in the X1 direction as shown in FIG. 6. As a result, the CCD imaging device 82 is contained within the housing 85 as shown in FIG. 16.

As shown in FIG. 18, the first lock pin member 86a and the second lock pin member 86b are positioned at different distances from the Y2 side (which extends in the X1–X2 direction) of the tray 86, so the states of engagement with the lock lever 90 also differ and as a result the amount of force needed to press the pushbutton 92a to insert the tray 86 into the housing 85 is less than the amount required in the case of pushing the tray 86 out from the housing 85. As a result, the action of putting the CCD imaging device 82 inside the housing 85 as shown in FIG. 16 is performed smoothly.

It should be noted that the amount of force required to press the pushbutton 92a so as to push the tray 86 from the housing 85, that is, the amount of pressure required to release the first lock pin member 86a, is large. As a result, the pushbutton 92a must be firmly pressed or the lock will not be released. Accordingly, the lock will not release and a portion of the tray 86 will not be accidentally extended from the housing 85 even if the pushbutton 92a is accidentally pressed while the laptop-type PC 40 is being carried.

Further, the second usage state as described above is characterized by two distinctive features, as follows.

First, the CCD imaging device 82 body 110 can be turned to the desired direction, so that, for example, as shown in FIG. 21, the lens unit 116 can be pointed in the Y1 direction. As a result, an image can be acquired without moving the PC main unit 41.

Second, the arrangement of the grooves 141a, 142a and the tabs 98a, 98b prevents improper insertion of the connector 140, that is, prevents the connector 140 from being inserted upside down. Accordingly, when the second usage state described above is concluded and the connector 140 of the CCD imaging device 82 is connected to the connector 95, the CCD imaging device 82 can be prevented from being improperly connected.

A description will now be given of a CCD imaging device expansion unit according to a second embodiment of the present invention, with reference to FIGS. 22A, 22B, 23, 24, 25, 26A and 26B.

Figure 23:
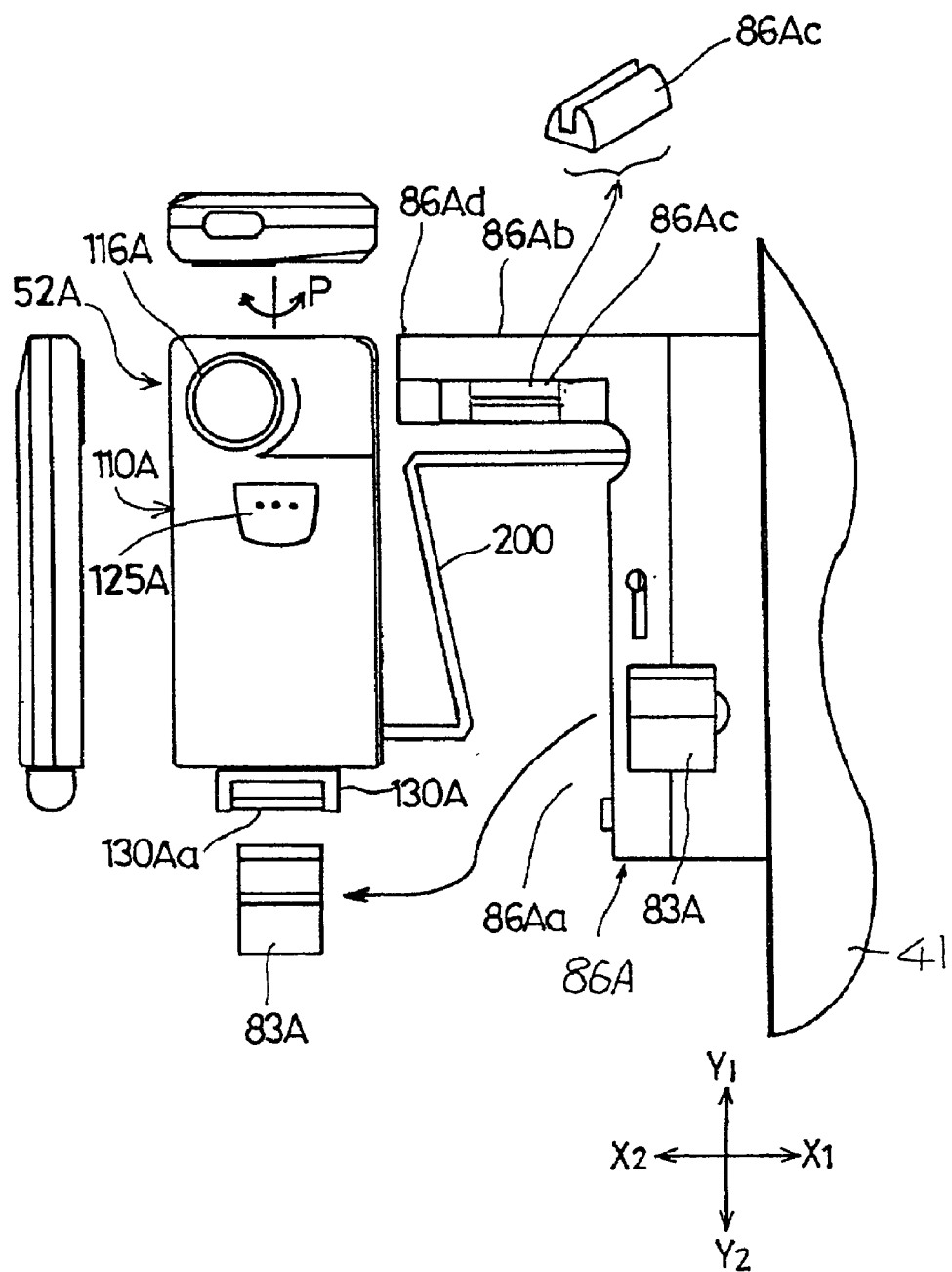
FIG. 23 is a diagram showing the relation between the CCD imaging device and the tray in a second usage state.
Figure 24:
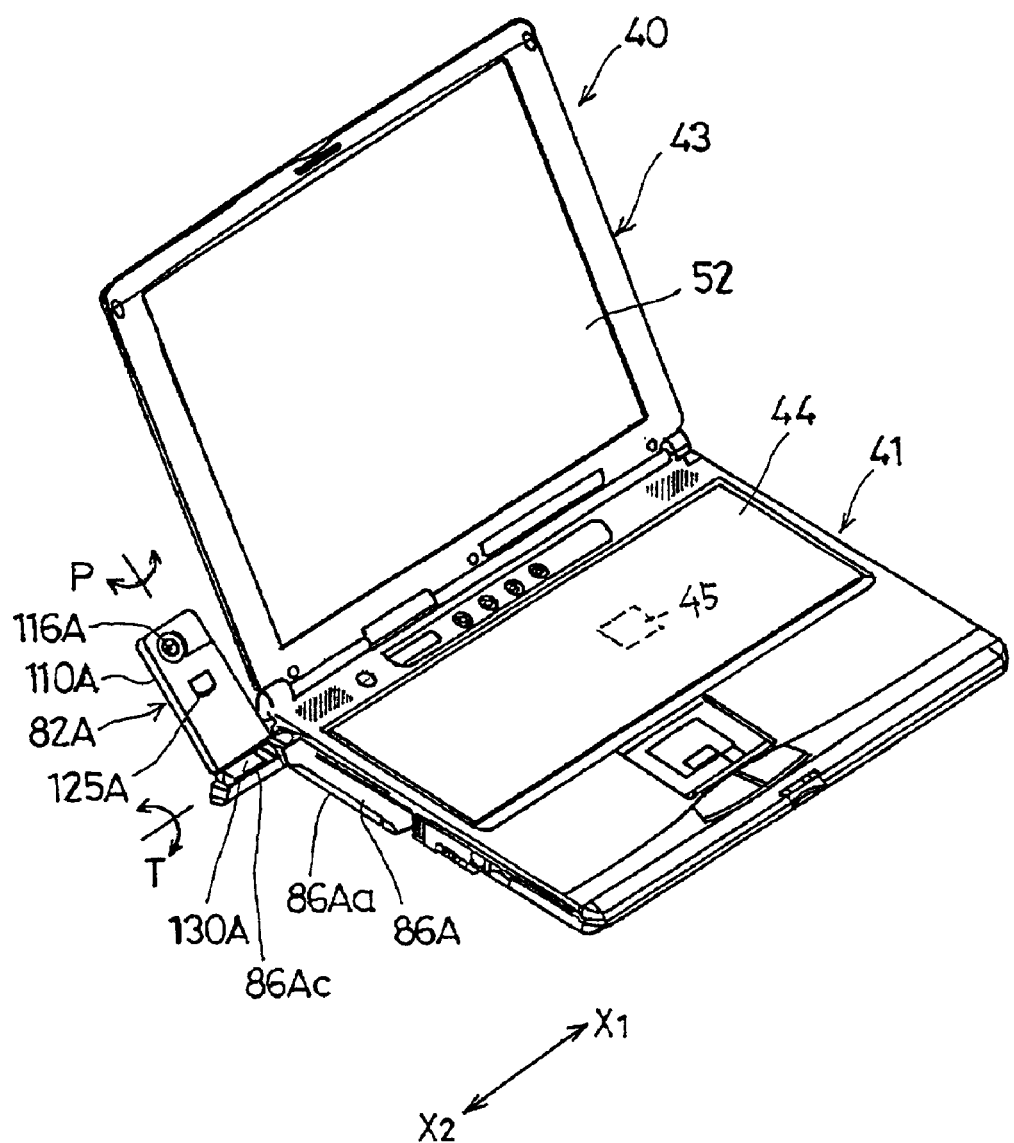
FIG. 24 is a diagram showing the CCD imaging device in a first usage state.
Figure 25:
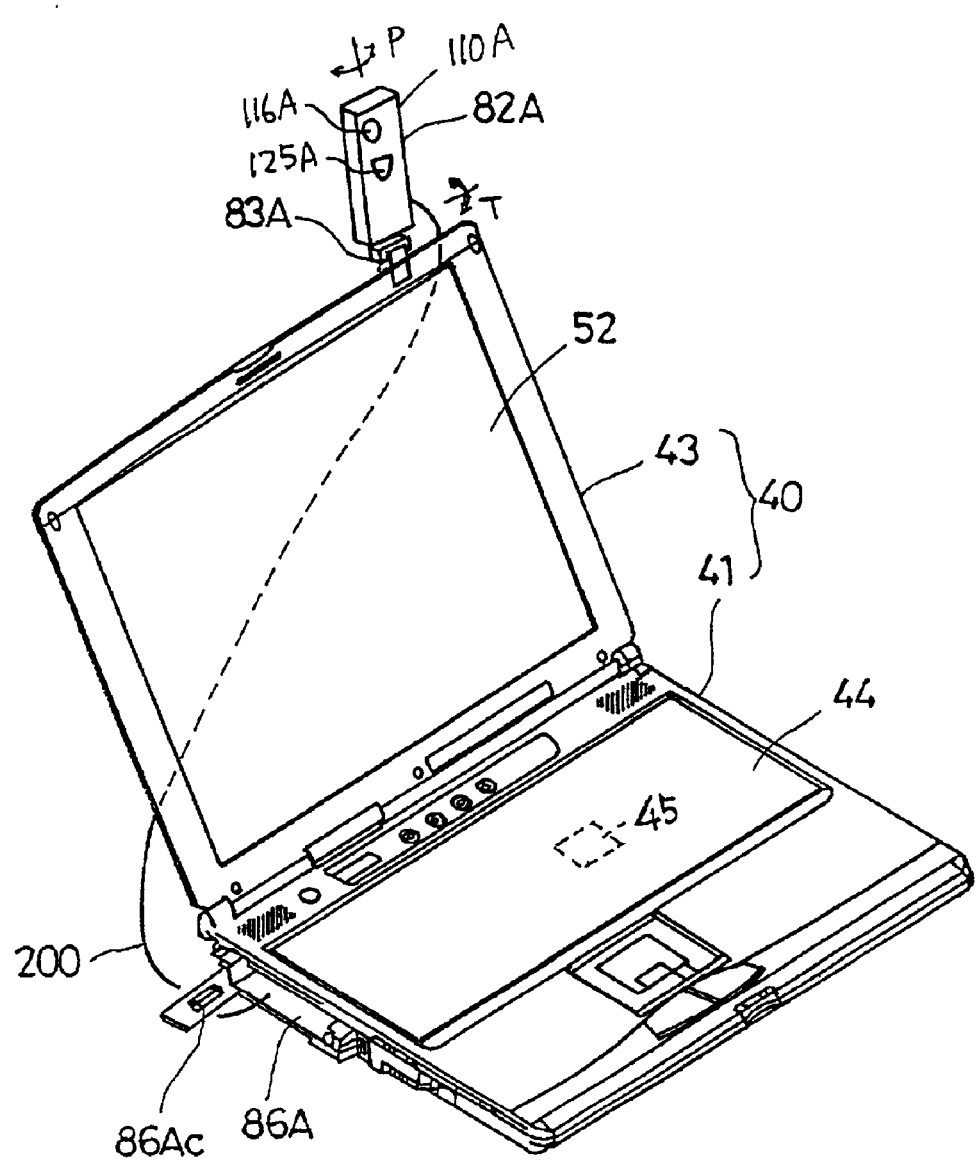
FIG. 25 is a diagram showing the CCD imaging device in a second usage state.

FIGS. 22A and 22B are diagrams showing front and side views of a CCD imaging device expansion unit according to a second embodiment of the present invention. FIG. 23 is a diagram showing the relation between the CCD imaging device and the tray in a second usage state. FIG. 24 is a diagram showing the CCD imaging device in a first usage state. FIG. 25 is a diagram showing the CCD imaging device in a second usage state. FIGS. 26A and 26B are diagrams showing front and side views of the CCD imaging device being supported in a second usage state.

The CCD imaging device expansion unit 80A has a structure essentially identical to the structure of the CCD imaging device expansion unit 80 according to the first embodiment described above, except that the CCD imaging device 82A and the connector 81A are electrically connected to each other by using a long cable 200.

As shown in FIG. 22A, a reel 201 around which a cable is wound is provided atop a tray 86A, the tray 86A itself being provided atop a housing 85A in such a way as to be movable in the X1–X2 direction. It is around this reel 201 that the cable 200 mentioned above is wound. The end of the cable 200 near the center of the reel 201 is electrically connected to the connector 81A by a flexible cable 202. The end of the cable 200 extending from the reel 201 is connected to a body 110A of the CCD imaging device 82A.

The CCD imaging device 82A comprises the CCD imaging device 82A body 110A and a base member 130A. The CCD imaging device 82A body 110A is rotatable in the direction of arrow P with respect to the base member 130A. In addition, the base member 130A has a side rod 130Aa and the CCD imaging device 82 body 110A has a lens unit 116A and a capture button 125A.

A notch 86Aa having a size corresponding to a size of the CCD imaging device 82A is cut into an X2 side of the tray 86A, with the tray 86A having an arm member 86Ab extending in the X2 direction along a Y1 side of the notch 86Aa. A mounting member 86Ac for mounting the CCD imaging device 82A is formed at an intermediate position of the arm member 86Ab, and a handle member 86Ad is formed at the X2 end thereof.

Additionally, a supporting member 83A is detachably attached to a region of tray 86A in the vicinity of notch 86Aa.

The CCD imaging device 82A is detachably mounted by snugly engaging the CCD imaging device 82A mounting member 86Ac with the side rod 130Aa of the base member 130A.

When the laptop-type PC 40 is carried, the CCD imaging device expansion unit 80A is loaded into the PC main unit 41 and the CCD imaging device 82A is laid flat. Since the CCD imaging device 82A has the same profile as the tray 86A, the CCD imaging device 82A is moved together with the tray 86A and inserted into the housing 85A.

The CCD imaging device 82A described above is used in the following two states.

1. The CCD imaging device 82A remains mounted on the laptop-type PC 40 (first usage state).

Using the handle member 86Ad described above, the operator pulls the tray 86A outward in the X2 direction to the position shown in FIGS. 23 and 24, and grasps and rotates the CCD imaging device 82 body 110A so as to stand the body 110A upward as shown in FIG. 24.

When acquiring an image, the operator grasps the CCD imaging device 82A body 110A in the left hand, and tilts and pans the body 110A in the direction of arrows T and P, respectively, as appropriate. The CCD imaging device 82 is operated by pressing the capture button 125A with the thumb of the left hand. Since the CCD imaging device 82 can be tilted and panned in the desired direction, the need to reposition the PC main unit 41 in order to acquire an image is eliminated.

In this case, the CPU 45 inside the PC main unit 41 can access the CCD imaging device 82A via the connector 81A and the connector 49 of the expansion bay inside the PC main unit 41.

2. The CCD imaging device 82A is detached from the laptop-type PC 40 (second usage state).

In the state shown in FIG. 24, the operator grasps and firmly pulls the CCD imaging device 82A body 110A while pressing and holding down the arm member 86Ab of the tray 86A, detaches the base member 130A from the CCD imaging device 82 camera mount 86Ac, and further, detaches the supporting member 83A. Next, as shown in FIGS. 26A and 26B, the supporting member 83A is mounted astride the front edge of the display unit 43. By pulling an appropriate length of the cable 200 from the reel 201 and firmly engaging the side rod 130Aa of the base member 130A of the CCD imaging device 82A body 110A with the supporting member 83A, the CCD imaging device 82A is mounted on the front edge of the display unit 43 as shown in FIG. 25.

When acquiring an image, the operator grasps the CCD imaging device 82A body 110A with the right hand, and tilts and pans the body 110A in the direction of arrows T and P, respectively, as appropriate. The CCD imaging device 82A is operated by pressing the capture button 125A with the thumb of the right hand, thus acquiring the image without the need to reposition the PC main unit 41.

After usage in the second state described above is completed, the supporting member 83A and the CCD imaging device 82A are stored in their original locations and the cable 200 rewound around the reel 201.

In this case, as with the first usage state described above, the CPU 45 inside the PC main unit 41 can access the CCD imaging device 82A via the connector 81A and the connector 49 of the expansion bay inside the PC main unit 41.

A description will now be given of other and further embodiments of the present invention.

The present invention can also be adapted so that the CCD imaging device 82 is extractably stored inside the PC main unit 41 without the use of a CCD imaging device expansion unit.

Additionally, the present invention can also be adapted so that the CCD imaging device expansion unit is not detachable but is fixedly mounted on the PC main unit 41.

Additionally, as can be appreciated, the CCD imaging devices 82, 82A described above, when detached from the PC main unit 41, can be operated in a hand-held state, that is, the operator can hold the CCD imaging devices 82, 82A in the hand for added ease of image acquisition.

In the embodiments described above, the descriptions have referred to a laptop-type PC, and more particularly, to a laptop-type PC having such an expansion bay. However, the present embodiment can specifically also be adapted to a configuration in which a so-called docking station, sometimes referred to as a function expansion unit, is connected to the laptop-type PC and provided with an expansion bay, with the CCD imaging device expansion unit 80 being inserted into such expansion bay. The docking station may for example be those disclosed in Japanese Laid-Open Patent App. No. 10-133778 and Japanese Laid-Open Patent App. No. 9-6475.

The typical such docking station supports one or more peripheral devices not included in the laptop-type PC itself. Normally, advantage is taken of the compactness of the laptop-type PC to carry the laptop-type PC about, with the docking station being connected either to the bottom or the rear of the laptop-type PC at home or the office, thus equipping the laptop-type PC with the capabilities typically associated with generally more powerful desktop-type PCs. The present invention can be adapted for use with such devices as well.

It should be noted that although for purposes of convenience the embodiments are described with reference to a laptop-type PC, in actuality the term laptop-type PC is meant to encompass any portable terminal or portable information processing apparatus. In addition, the term PC includes an apparatus having any type of processor, an apparatus for performing any type of information processing, and an apparatus for performing an action related to information processing, such as, for example, data storage, data communications, and the like.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 11-246403, filed on Aug. 31, 1999, the entire contents of which are hereby incorporated by reference.

What is claimed is:

1. An expansion unit capable of being detachably mounted to an expansion bay of an information processing apparatus, the expansion unit comprising:
   an imaging device;
   a moving member moving the imaging device between a state in which the imaging device is stored inside the expansion unit and a state in which the imaging device projects outwardly from the expansion unit; and
   a member capable of changing a direction in which the imaging device is pointed when the imaging device is extended from the expansion unit,
   the imaging device being detachable from the expansion unit and supportable in such detached state,
   the expansion unit further comprising:
   a cable for connecting the imaging device to the information processing apparatus when the imaging device is detached from the expansion unit; and
   a cable storage compartment inside the expansion unit for storing the cable.

2. The expansion unit as claimed in claim 1, wherein the cable is stored in the cable storage compartment.

3. The expansion unit as claimed in claim 2, wherein the cable is stored in the cable storage compartment with one end of the cable connected to the imaging device and another end of the cable connected to the expansion unit.

4. The expansion unit as claimed in claim 2, wherein the cable is stored in the cable storage compartment in a state in which the cable is disconnected from the imaging device.

5. The expansion unit as claimed in claim 1, wherein the cable is stored in a wrapped state in the cable storage compartment.

6. The expansion unit as claimed in claim 1, further comprising a mechanism for preventing improper mounting of the imaging device on the expansion unit.

7. An expansion unit capable of being detachably mounted to an expansion bay of an information processing apparatus, the expansion unit comprising:

an imaging device;
a moving member moving the imaging device between a state in which the imaging device is stored inside the expansion unit and a state in which the imaging device projects outwardly from the expansion unit; and
a member capable of changing a direction in which the imaging device is pointed when the imaging device is extended from the expansion unit,
the imaging device being detachable from the expansion unit and supportable in such detached state,
the expansion unit further comprising:
a supporting member for supporting the imaging device on the information processing apparatus when the imaging device is detached from the expansion unit; and
a storage compartment inside the expansion unit for storing the supporting member.

8. The expansion unit as claimed in claim 7, wherein the supporting member is stored in the supporting member storage compartment.

9. An expansion unit capable of being detachably mounted to an expansion bay of an information processing apparatus, the expansion unit comprising:
an imaging device;
a moving member moving the imaging device between a state in which the imaging device is stored inside the expansion unit and a state in which the imaging device projects outwardly from the expansion unit; and
a member capable of changing a direction in which the imaging device is pointed when the imaging device is extended from the expansion unit,
the imaging device being detachable from the expansion unit and supportable in such detached state,
the expansion unit further comprising:
a connecting member that is connected to the information processing apparatus when the expansion unit is mounted in the expansion bay of the information processing apparatus; and
a connecting mechanism connecting the connecting member and the imaging device,
the expansion unit being connected to the information processing apparatus via the connecting mechanism and the connecting member when the expansion unit is mounted in the expansion bay.

10. A portable information processing apparatus comprising:
an imaging device;
a moving member moving the imaging device between a state in which the imaging device is stored inside the portable information processing apparatus and a state in which the imaging device projects outwardly from the portable information processing apparatus; and
a member capable of changing a direction in which the imaging device is pointed when the imaging device is extended from the portable information processing apparatus,
the imaging device being detachable from the expansion unit and supportable in such detached state,
the portable information processing apparatus further comprising:
a cable for connecting the imaging device to the information processing apparatus when the imaging device is detached from the expansion unit; and
a cable storage compartment inside the expansion unit for storing the cable.

11. A portable information processing apparatus comprising:
an imaging device;
a moving member moving the imaging device between a state in which the imaging device is stored inside the portable information processing apparatus and a state in which the imaging device projects outwardly from the portable information processing apparatus; and
a member capable of changing a direction in which the imaging device is pointed when the imaging device is extended from the portable information processing apparatus,
the imaging device being detachable from the expansion unit and supportable in such detached state,
the portable information processing apparatus further comprising a supporting member storage compartment inside the portable information processing apparatus for storing a supporting member that supports the imaging device on the information processing apparatus when the imaging device is detached from the portable information processing apparatus.

12. A portable information processing apparatus comprising:
an imaging device;
a moving member moving the imagine device between a state in which the imaging device is stored inside the portable information processing apparatus and a state in which the imaging device projects outwardly from the portable information processing apparatus; and
a member capable of changing a direction in which the imaging device is pointed when the imaging device is extended from the portable information processing apparatus,
the imaging device being detachable from the expansion unit and supportable in such detached state,
the portable information processing apparatus further comprising a connecting cable storage compartment inside the portable information processing apparatus for storing a connecting cable for connecting the imaging device to the portable information processing apparatus when the imaging device is detached from the portable information processing apparatus.

13. A portable information processing apparatus comprising:
an imaging device;
a moving member moving the imaging device between a state in which the imaging device is stored inside the portable information processing apparatus and a state in which the imaging device projects outwardly from the portable information processing apparatus; and
a member capable of changing a direction in which the imaging device is pointed when the imaging device is extended from the portable information processing apparatus,
the imaging device being detachable from the expansion unit and supportable in such detached state,
the portable information processing apparatus further comprising a holder for storing both the supporting member for supporting the detached imaging device on the portable information processing apparatus and a connecting cable connecting the detached imaging device and the portable information processing apparatus.

* * * * *